(12) United States Patent
Smith et al.

(10) Patent No.: US 11,100,483 B2
(45) Date of Patent: Aug. 24, 2021

(54) HIERARCHICAL DATA INFORMATION

(71) Applicant: Intel Corporation, Santa Clara, CA (US)

(72) Inventors: Ned M. Smith, Beaverton, OR (US); Rajesh Poornachandran, Portland, OR (US); Michael Nolan, Maynooth (IE); Simon N. Peffers, Action, MA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 15/858,097

(22) Filed: Dec. 29, 2017

(65) Prior Publication Data

US 2019/0034892 A1 Jan. 31, 2019

Related U.S. Application Data

(63) Continuation-in-part of application No. 15/720,514, filed on Sep. 29, 2017, now abandoned.

(51) Int. Cl.
| | | |
|---|---|---|
| G06Q 40/04 | (2012.01) | |
| G06Q 20/36 | (2012.01) | |
| G06Q 40/06 | (2012.01) | |
| G06Q 20/12 | (2012.01) | |
| H04L 29/08 | (2006.01) | |
| H04L 9/06 | (2006.01) | |

(Continued)

(52) U.S. Cl.
CPC ........... *G06Q 20/1235* (2013.01); *G06N 5/00* (2013.01); *G06Q 20/065* (2013.01); *G06Q 20/36* (2013.01);
(Continued)

(58) Field of Classification Search
CPC .... G06Q 40/04; G06Q 30/0275; G06Q 40/00; G06Q 40/06
See application file for complete search history.

(56) References Cited

U.S. PATENT DOCUMENTS

| | | |
|---|---|---|
| 7,069,234 B1 | 6/2006 | Cornelius et al. |
| 7,937,312 B1 | 5/2011 | Woolston |

(Continued)

OTHER PUBLICATIONS

Mattila, Juri, 2016. "The Blockchain Phenomenon—The Disruptive Potential of Distributed Consensus Architectures," ETLA Working Papers 38, The Research Institute of the Finnish Economy. (Year: 2016).*

(Continued)

*Primary Examiner* — Elda G Milef
(74) *Attorney, Agent, or Firm* — Schwegman Lundberg & Woessner, P.A.

(57) ABSTRACT

Systems and methods for exchanging digital content in an online layered hierarchical market and exchange network are disclosed. A Buyer utilizes one or more Curry functions that are relevant to content to be acquired thereby developing a Margin Future estimate for the received content. Each e-market layer in the hierarchy adds value to the content for use with one or more other e-market layers. Value is added by executing a Margin Function including a Curry function on the content, as defined in the Margin Future. An embodiment includes data, information, knowledge, and wisdom (DIKW) e-market layers. The Margin Future estimate may be recorded with an escrow agent acting as an intermediary with Investors. Once funded, the Buyer may acquire the content from the Seller and apply value added. Payment may be made when the value added content enters the e-market using electronic wallets. Other embodiments are described and claimed.

25 Claims, 13 Drawing Sheets

(51) Int. Cl.
*G06N 5/00* (2006.01)
*G06Q 20/06* (2012.01)
*H04L 9/32* (2006.01)

(52) U.S. Cl.
CPC ............ *G06Q 40/04* (2013.01); *G06Q 40/06* (2013.01); *H04L 9/0637* (2013.01); *H04L 9/3239* (2013.01); *H04L 67/1042* (2013.01); *H04L 2209/38* (2013.01); *H04L 2209/56* (2013.01); *H04L 2209/805* (2013.01)

(56) References Cited

U.S. PATENT DOCUMENTS

| | | | |
|---|---|---|---|
| 10,338,553 B2 * | 7/2019 | Cella | G06N 20/00 |
| 2016/0292680 A1 | 10/2016 | Wilson, Jr. et al. | |
| 2017/0213198 A1 * | 7/2017 | Ochynski | G06Q 20/102 |
| 2019/0102837 A1 | 4/2019 | Smith et al. | |

OTHER PUBLICATIONS

Nicoletti, Bernado. "Fintech Innovation." The Future of FinTech pp. 81-159; Mar. 3, 2017. (Year: 2017).*
"Currying", Wikepedia, https://en.wikipedia.org/wiki/Currying Accessed on Mar. 28, 2018, (Mar. 8, 2018), 10 pgs.
"U.S. Appl. No. 15/720,514, Non Final Office Action dated Oct. 3, 2019", 11 pgs.
"U.S. Appl. No. 15/720,514, Response filed Jan. 2, 2020 to Non Final Office Action dated Oct. 3, 2019" 12 pgs.

* cited by examiner

HIERARCHICAL DATA INFORMATION

CROSS-REFERENCE TO RELATED APPLICATIONS

This application is a continuation-in-part of U.S. patent application Ser. No. 15/720,514, entitled "Competitive Online Data Market And Exchange Network," filed on Sep. 29, 2017, which is incorporated by reference herein in its entirety.

TECHNICAL FIELD

Embodiments described herein generally relate to processing techniques used with data communications and interconnected and layered device networks, and in particular, to techniques applied within internet of things (IoT) devices and device networks.

BACKGROUND

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

Information collected from various IoT sensors and sensor arrays, data scraped from websites, or from data mining activities may be used by third parties in various applications. For instance, temperature or weather measurements at various geographical locations may be used in weather models, or for automatically adjusting heating and air conditioning in smart buildings, etc. Existing systems do not use or trade data or information as a commodity. Instead, data may be purchased from a provider directly, and charges based on the amount of streamed data or data consumed by application program interface (API) calls, e.g., metering. Out of band (OOB) payments may be used to pay for data, such as credit cards, purchase order, etc. Moreover, traditional data exchanges transact exclusively in data, information or more recently knowledge exchanges. Thus, transactions across a variety of exchanges (e.g. data, information and knowledge) in an e-market do not exist.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
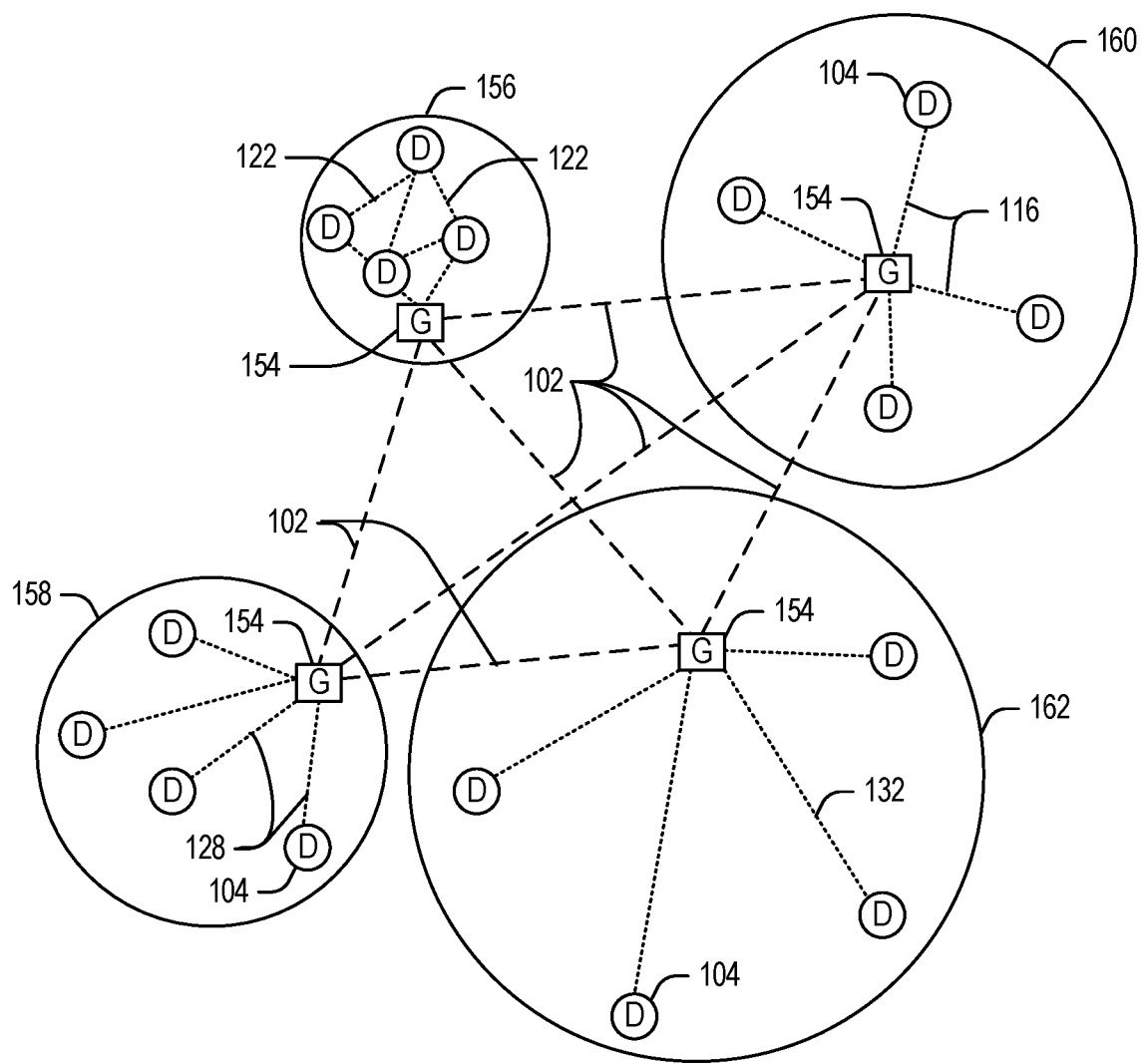
FIG. 1 illustrates an domain topology for respective internet-of-things (IoT) networks coupled through links to respective gateways, according to an example.

In the following description, methods, configurations, and related apparatuses are disclosed for the processing of a data market exchange in an IoT device interconnection setting through the use of sensor collection and dissemination mechanisms for the market exchange of data collected by a series of sensors and/or IoT devices.

Traditional data exchanges "transact" data through a system of publishers and subscribers (or suppliers and consumers) where the publisher promises delivery of the data to subscribers but publishers do not know how subscribers will use/modify/forward the data. The supplier is free to add value through 'mashups' or other transformation subsequent to publication by a publisher. Data, as discussed herein, is not physical and is transmitted electronically. In contrast to, for instance, a barrel of oil which can be traded or consumed only once, electronic data may be replicated and shared, thereby potentially diminishing the value to the original data owner. Digital rights management (DRM) technology is a way to protect published content from unauthorized copying/viewing but does not control transformations or mashups except through legal contract, or other enforceable agreement. These agreements, or contracts, may exist outside the scope of the information exchange or are opaque to the relationship between information and Currying methods.

An e-market that is designed to relate transactions across a variety of exchanges (e.g. data, information and knowledge) is unprecedented. The cutting-edge Artificial Intelligence (AI) work appears to be on the cusp of inventing algorithms that may be characterized as "wise." This raises the prospect for an e-market for "wisdom computing" that is trustworthy, monetizable and can collaborate with existing e-markets.

Solutions may employ AI technique's cognitive sciences that hypothesizes a hierarchical layering of cognition based on the Data, Information, Knowledge, Wisdom (DIKW) pyramid. The pyramid layers define data, information and knowledge in ways that computer science can map readily into computational structures and algorithms. However, the mapping to wisdom is less clear. Nevertheless, recent scientific findings suggest AI is effective at mapping some vectors of what psychology deems is "wisdom."

Specifically, wisdom may be defined in terms of knowledge that is experienced. AI and Deep Learning (DL) are being used to apply experience to robot learning models. The authors speculate that deep learning models for applying experience to knowledge models is not far off. As "wisdom" becomes more viable as a consumable product an e-market for wisdom will emerge. Embodiments herein describe systems and methods for leveraging the emergence of tradable wisdom products as a function of the DIKW pyramid.

Current systems do not provide a mechanism that can transform data to information, information to knowledge and knowledge to wisdom, in a series of interconnected and layered e-markets. Existing AI models do not have a way to quantify the wisdom derived from data, information and knowledge e-markets. Autonomous agents that participate in a common e-market can potentially share respective experiences in the context of a "wisdom" e-market as a way of quickly acquiring an "experienced" knowledge model; one suitable for trade and monetization in an e-market (instead of each autonomous agent gaining the knowledge experience individually—which is very inefficient). Previous models do not anticipate use of Curry functions applied recursively to data, information, knowledge and wisdom to produce a result that can be evaluated, traded and monetized in an e-market. Financial speculation can be applied to fund research, development and monetization of data, information, knowledge and wisdom "futures" that has marginal value according to the design of this invention.

Currying is a mathematical technique of translating the evaluation of a function that takes multiple arguments (or a tuple of arguments) into evaluating a sequence of functions, each with a single argument. Currying is related to, but not the same as, partial application. Currying techniques may be used to transform the information into a result that has quantified "marginal" value, hereafter defined as "Margin." Embodiments described herein use information exchange technology to valuate both information and an algorithm that can be curried (bound) to a data set to produce a new data set having quantified information value. In some examples, a Curry function may be a "nested" data set where multiple Curry functions are used in series where an inner function is evaluated before an outer function, and where function evaluation may be based on a variety of conditions. Curry functions may be specific to a data type and may utilize various conditions or parameters. Curry functions may be developed by third parties and be available for purchase, license, shareware, barter, subscription, etc. In an embodiment, a Buyer may have access to Curry functions by paying a license fee for access to a relevant Curry database, or subset thereof. In another embodiment, a Buyer may have a subscription or other on-going agreement with the Curry database provider. In another embodiment, the Buyer is also the developer or owner or the Curry database and has full access. Various types of digital assets may be accepted as payment for use of the Curry function or Curry database.

Traditional data exchanges also make payment for data via an out-of-band payment system (e.g., credit cards, cash, coupons etc.). The value of data is therefore normalized according to the payment systems' currency valuation strategy, which may be subject to a variety of manipulations, costs (ranging from interest, fees, exchange rates and liquidity) and valuation. An information exchange that includes a payment system is sometimes referred to as an information market. Embodiments described herein incorporate "Investors" in an information market, where an Investor may invest in an information "Margin" using a digital currency. It should be noted that a variety of digital currency types may be used as "payment" that are made available as digital currency, such as bitcoin, an identified barter item, item for trade, subscription, promise to pay later, immediately convertible cash currency, other digital data, etc.

Embodiments herein consider a model for an e-market that defines a method for investing in data, information, knowledge and wisdom exchanges that uses Currying functions as a way to relate input resulting from the output of a more primitive e-market with current e-market functions that, in turn, generates output suitable for input to a next higher layer e-market; according to the DIKW layering model.

Data (sensor) networks may feed an e-market designed to consume that data, but also produce a next higher layer product termed "information." The information may then inform an "Information e-market" and is designed to produce a next layer output in the form of "knowledge." The knowledge may then likewise be consumed by a "Wisdom e-market".

In an embodiment, autonomous agents may participate in e-markets to garner insights (in the form of Curry functions) that enables evolutionary analytical models. Curried evaluations may be tracked for auditability, provenance, etc. and may be instantiated as "e-assets" that are sold/exchanged in an e-market. Collaboration among autonomous agents may "discover" hidden supply and demand cases for e-assets. In an era of autonomous agents (e.g. vehicles, drones, robots, etc.), the capability to quantify and track the wisdom in an hierarchical manner across collaborative autonomous agents which can be in turn traded as assets in an information exchange economy have a certain advantage over existing myopic and simple data exchanges.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein.

Furthermore, well-known features may be omitted or simplified in order not to obscure the described embodiments. Various examples may be given throughout this description. These are merely descriptions of specific embodiments. The scope or meaning of the claims is not limited to the examples given.

Blockchains have been used to implement digital currency (e.g., Bitcoin—BTC, Ethereum—Gas, etc.) and may be used to transact information and contracts, and other agreements. Existing "information exchange/market" works by exchanging services for data. For example, users of Facebook® social media (e.g., Sellers) contribute data and get access to the Facebook® platform. YouTube™ video is an example of 'margining'—where a viral video gets monetized directly based on the value of the content in terms of the number of views. However, existing approaches do not have the notion of Currying functions and information resulting in an information "Future" that has marginal value.

FIG. 1 illustrates an example domain topology for respective internet-of-things (IoT) networks coupled through links to respective gateways. In an embodiment, a data exchange may receive data from one or more IoT networks of sensors, for transformation into information with value added over the raw data. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. In embodiments, various IoT devices may collect information to be exchanged via a competitive data market.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
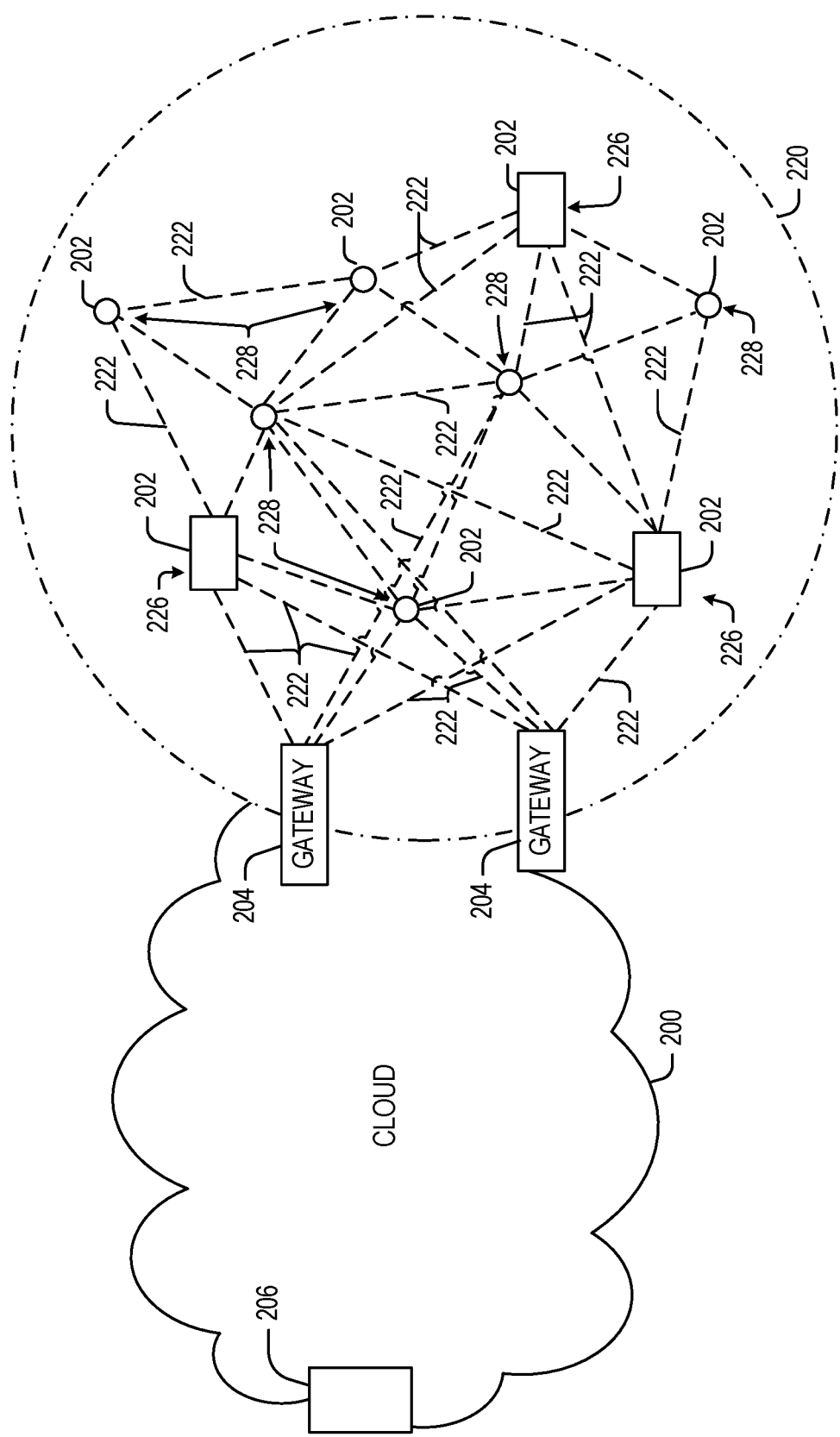
FIG. 2 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIG. 1 and FIG. 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without a centralized control system. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous operation and coordination of service delivery against contractual service objectives, orchestration and quality of service (QoS). Distributed control supports swarming and fusion-of-resources believed to be important aspects of a distributed information market based on Currying. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 11 and 12.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available. In an embodiment, the fog network 220 and cloud network 200 may be termed a sensor network, as described below.

Figure 3:
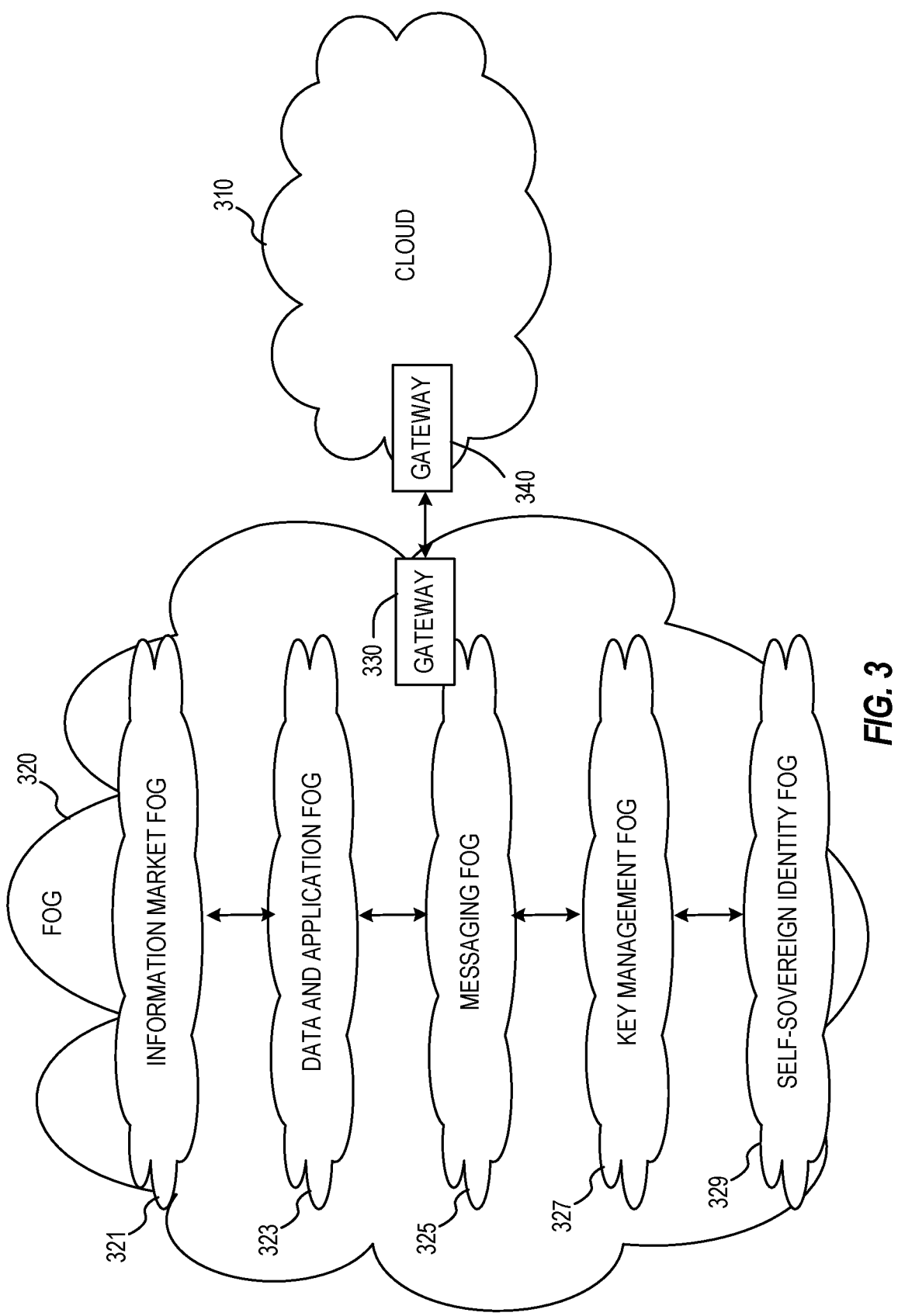
FIG. 3 illustrates layers of a cloud network with fog components beneath a distributed information market, according to an embodiment.

FIG. 3 illustrates layers of a cloud network with fog components beneath a distributed information market, according to an embodiment. For instance, cloud 310 may communicate with fog 320 via gateways 330 and 340. The fog 320 may refer to a network that operates behind a gateway 330, privately. Cloud 310 may have the same functional layers as the fog 320 but cloud layers may take place in public; that is, on a third party computer network, such as Amazon Web Services (AWS) available from Amazon.com.

In an embodiment, the information market as described herein may function exclusively in a cloud environment. But operation may be distributed across many Blockchain nodes where each fog layer 321, 323, 325, 327 and 329 has the ability to coordinate and synchronize a distributed state according to one or more Blockchain systems. This is also known as distributed byzantine agreement and fault-tolerant byzantine agreement.

The fog embodiment 220 (FIG. 2) may be realized using one or more of the following layers: the information market fog 321, the data and application fog 323, the messaging fog 325, the key management fog 327, or the self-sovereign identity fog 329 as shown. Cloud 200 (FIG. 2) may comprise similar layers, but are hosted on publicly visible hosting services. Another name for fog 320 may be "private cloud" or "distributed private cloud."

Figure 4:
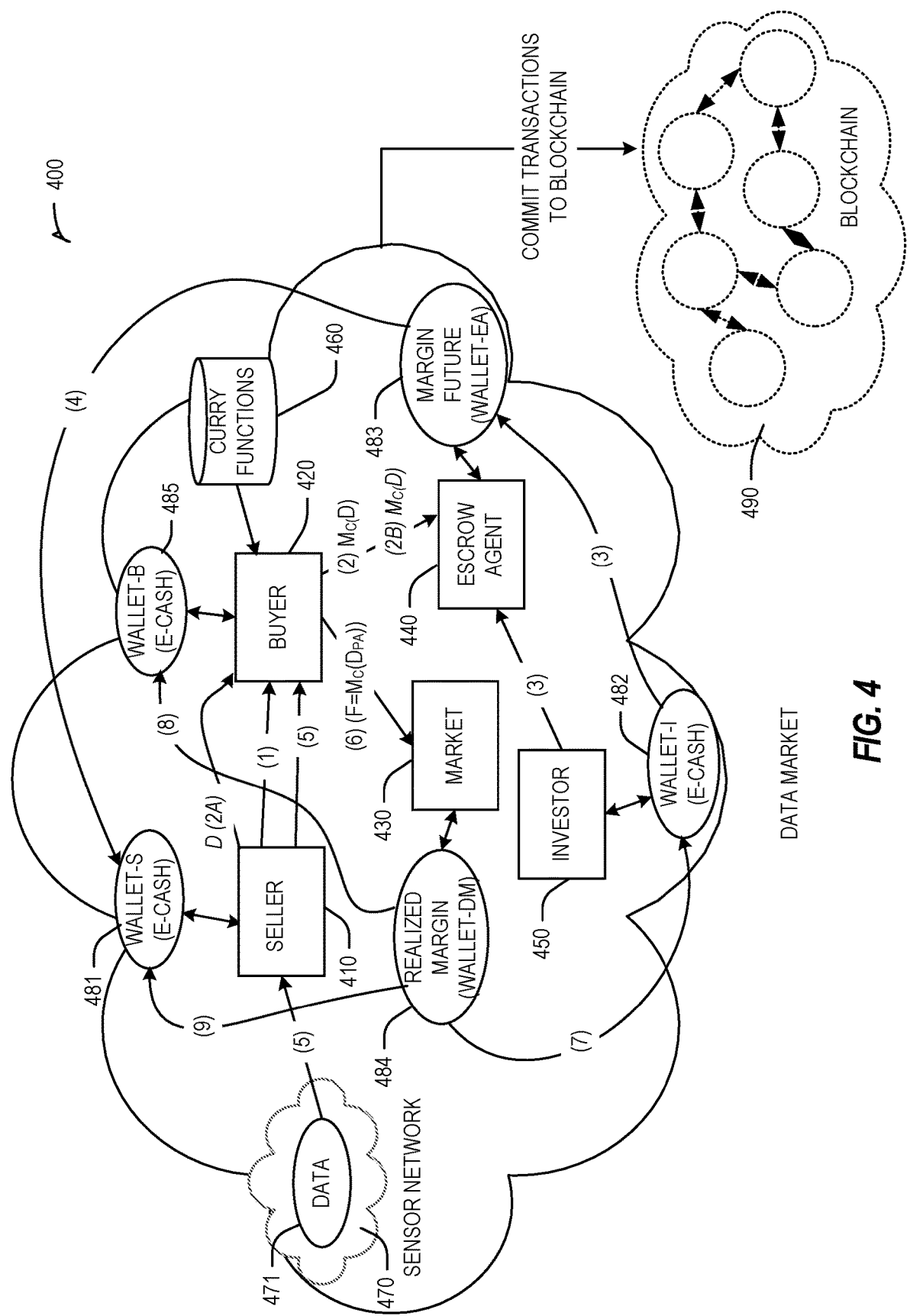
FIG. 4 illustrates a network for a competitive data market and exchange, according to an embodiment.

FIG. 4 illustrates an example competitive data market and exchange network 400 at a first layer, according to an embodiment. It should be noted that the data market and exchange network 400 may also be referred to as the "exchange," "data exchange," "information exchange" or "data market exchange" interchangeably, and for simplicity, herein. In an embodiment, data 471 collected in the sensor network 470 may be provided to, or collected by, a Seller 410. One Seller 410, one Buyer 420, and one Investor 450 are shown, but it will be understood that more than one Seller 410, Buyer 420, Investor 450, or other entity in exchange network 400 may be present. More than one Seller 410 may have access to data from one or more IoT networks in sensor network 470 for providing data to the exchange. More than one Buyer 420 may vie for exclusive or non-exclusive use of the data, etc. An example data or information network (IE) may have three parts: (1) one or more Seller 410 comprising sensor networks, data networks, discrete devices, streaming data/media sources, etc. 470 that are equipped with IE technology for performing the Seller role; (2) one or more Buyer 420 comprising Buyer technology where Buyers have an algorithm or method for converting Seller data into marginal value (aka "Margin"); and (3) one or more Investors 450 who supply capital (e.g., in the form of e-currency) to the exchange 400 such that Buyers 420 may borrow from Investors 450 in order to pay Sellers 410. Investors 450 may receive interest in exchange for investment in Buyer's Margin.

Sellers 410 may incur costs related to the production of data 471 (information). In an example, a Seller 410 may receive raw information from the sensor network 470 and perform aggregation, analysis or other manipulation of the data 471 to add value. Buyers 420 may generate Margin by combining Seller data 471 with Margin algorithms (aka Currying); and Margin may be distributed among the Sellers 410, Investors 450, and Buyer 420 to pay costs, interest and profits.

An algorithm (or set of algorithms) that "Curry" the information supplied by Sellers 410 to form an information "Future" may be stored in a Curry function database 460. Information Futures may be traded as an investment within the information exchange 400.

In an embodiment, the information exchange 400 is implemented using Blockchain technology 490. In an embodiment, a centralized model may be used where, for example, a streaming media provider such as YouTube™ video may leverage implementations to scale out to a multi-sided platform in a centralized fashion.

Advantages of the competitive data market and exchange network 400, as described herein, include being able to capture and retain more of the information market value than in existing systems, thereby increasing the potential value of the exchange. Use of the Curry functions provides a quantifiable future estimate of the value, e.g., Margin Future, of the transformation of data into information with value added. Existing markets do not employ the concept of Curry functions to improve margin estimate and return on investment for inflation. Embodiments may leverage the scaling of two-party margining to multi-sided data platforms, wherein content may change hands multiple times with "mash-up" of both data and Curry functions happening multiple times where product of mash-up is a higher value object, and where an object produced is an investment Future. Further, a Blockchain-based decentralized distributed ledger may help minimize the transaction value and improve public auditability on the transactions, especially of significant value in a multi-sided information exchange.

For example, a fictitious footwear retailer (e.g., "Shoes-R-Us") may have developed a Curry function $f(x)$ that given a 360° three-dimensional (3D) image of a customer's foot dimensions may generate commands to produce a perfectly sized shoe using a 3D printer. The function input (x) may be obtained from a sensor network operated by a 360° 3D camera vendor (e.g., "MagicCam"). MagicCam wants to sell (x) to Shoes-R-Us, while Shoes-R-Us wants sources for (x) so they may generate revenue by offering $f(x)$ as a service. Both Shoes-R-Us and MagicCam use the information market to advertise availability of both (x) and $f(x)$. MagicCam places a constraint on (x) that $1000 is required in advance in order to deliver (x) reliably. An Investor (e.g., "Ike") wanting to participate in the market buys interest (i) in an $f(x)$ margin function $M(f(x))$ such that the $1000 investment (i) becomes a claim on $M(\ )$ e.g., $M(f(x), i)$. Ike places his $1000 investment into an escrow wallet that later will be distributed to MagicCam for the production of (x). When (x) is ready for consumption, Shoes-R-Us buys the future $M(\ )$; which authorizes access to (x) and legally obligates Shoes-R-Us to pay the agreed interest on (i). Shoes-R-Us generates revenue from the service built around $f(x)$ and uses those funds to pay Ike and MagicCam. The exchange of data, Curry function, future and e-cash are achieved using the information market as defined herein.

Referring again to FIG. 4, an example data market exchange 400 may comprise a set of actors, e.g., Sellers 410, Buyers 420, Investors 450, escrow agents 440, and data market 430. The data market 430 may also be referred to by the term "information market." The data market 430 is the method and apparatus of the market framework. In an embodiment, the data market 430 is a system of message exchanges between multiple parties to achieve the objective of combining a data set to a Curry function, where the combination may be tied to an economic exchange—all within the framework of the 'data market' system. The data market exchange 400 may comprise a set of electronic wallets 481-485, corresponding to each actor 410, 420, 430, 440 and 450, for instance, for e-cash and/or Blockchain transactions. It will be understood that an electronic wallet is a storage repository that may comprise data, Margin Future conditions, investment, escrow or other information, in addition to digital currency. The data market exchange 400 also includes a data source such as sensor network 470.

A Seller 410 may operate a data collection/sensing infrastructure such as an IoT network, autonomous vehicle, smart home, agricultural automation system etc. A Buyer 420 may develop data analytics methods that may be curried to a particular data set. The Buyer 420 and Seller 410 may collaborate to find interoperable data structures and techniques such that a Seller data set 471 may be curried to a Buyer's Curry function 460. An Investor 450 may convert currency from outside sources into information market e-cash, e.g., a digital currency, or other tradable digital asset. The exchange rate may be determined based on the value of the information market divided by the e-cash coin in circulation. Bitcoin is an example of an e-currency that may be used. In an embodiment, an escrow agent 440 is a holding entity that places a Curry function, data set fulfillment promise and e-cash, to create an information Future. A Future is a speculation that the items in escrow will realize a profit in a data market. The data market 430 is an institution or enterprise that produces monetized value given a data set and a Curry function. A market 430 may be a traditional brick-and-mortar market or another form of e-market.

In an embodiment, each entity in the data market exchange 400 has a virtual or electronic wallet (eWallet). As illustrated in FIG. 4, a Seller 410 has Wallet-s 481; a Buyer 420 has Wallet-b 485; an Investor 450 has Wallet-i 482; an escrow agent 440 has Wallet-ea 483; and data market 430 has wallet-dm 484. In an embodiment, Wallet-dm 484 may be used to receive profits from a data market operation (e.g., transaction). The Wallet-dm 484 may pay the Seller 410, Buyer 420 and Investor 450 stakes in a Margin Future. Wallet-ea 483 may receive investments from an Investor (Wallet-i 482) tied to an information Future. The Wallet-ea 483 may pay costs associated with the production/collection of data earmarked for a Margin Future. Wallet-i 482 may receive e-cash from external sources and from a realized Margin wallet (e.g., Wallet-dm 484) to compensate for Investor stake in a Margin Future. Wallet-b 485 may receive e-cash from realized Margin investments to compensate for Buyer stake in a Margin Future. Wallet-s 481 may receive e-cash from a Margin Future escrow wallet (e.g., Wallet-ea 483) and from realized Margin wallet (e.g., Wallet-dm 484) to compensate for Seller stake in a Margin Future. It will be understood that while embodiments herein are described as trading in digital currency, or e-cash, any tradable digital asset may be used for payment, as defined in the agreements (e.g., smart contract, or Margin Future, etc.).

In an example embodiment, as illustrated in FIG. 4, various transactions may occur and are labeled with a transaction, or activity number, within parentheses. In an illustrative transaction, a Seller 410 supplies a contract to a Buyer 420 with a guarantee to provide a data set 471 that satisfies a stored Buyer Curry function 460, at (1). The Buyer 420 creates a Margin Future Mc(D) 483, at (2) (consisting of a Curry function, data set provision guarantee, data acquisition cost and Seller/Buyer stake) and places the Margin Future in escrow via an escrow agent 440, at (2). A wallet, as described herein, may be seen simply as a secure storage resource, and may store both the e-cash transaction information, as well as, information related to the transaction. In an embodiment, a "Future" is a contract, or agreement, that obligates a Buyer to provide a Curry function; a Seller to provide a data set and an Investor to provide capital. The respective parties do not have to actually produce the function, data or capital in order to create a Margin Future. They may, for example, supply a "claim" instead. In this context, a claim is a term of art and may be defined as a tuple of (claim type, right, value). The claim type distinguishes classes of claims. The right is a capability over a resource. The value refers to something over which a right is defined.

In an embodiment, an e-wallet (Wallet-ea 483) stores the Margin Future because in most cases the Investor will supply e-cash. But even so, e-cash is conceptually a "claim" that obligates two wallets to offsetting transactions (e.g., debit wallet A $100, and credit wallet B $100). In an embodiment, the curried Margin function Mc(D), at (2), creates a Margin Future. An Investor 450 may create a Margin Future comprising the Margin function, Investor stake and infusion of investment (e-cash) at (3). The Wallet-i 482 may pay data acquisition costs to Wallet-s 481 to cover operational costs of harvesting the data, shown via the escrow agent Wallet-ea 483 at (4).

In an embodiment, activities at (2) and (3) result in a Margin Future. Conceptually, activity (2) may be seen as two actions, e.g., (2a) and (2b), where data D is shown coming from Seller (2a) and Mc( ) is coming from Buyer (2b). Then the Margin Future may be seen as the combination of activities (2a, 2b and 3) producing Mc(D).

In an embodiment, the Seller data source in the sensor network 470 may produce a data set 471 and supply it to a data market 430 via the Seller 410, at (5). A Buyer 420 may supply the Margin function $F=M_C(D_{PA})$ to the data market 430, where the market creates Margin and generates a return on the Margin Future. E-cash profits are supplied to the data market Wallet-dm 484, at (6). The Wallet-dm 484 may then pay the Investor stake in the Margin Future to Wallet-i 482, at (7). Wallet-dm 484 pays the Buyer stake in the Margin Future to Wallet-b 485, at (8). And Wallet-dm 484 pays Seller stake in the Margin Future to Wallet-s 481, at (9).

In an embodiment, the Curry functions 460 are functions that return another function. A function is a binding between data and some operation. Currying allows recursive application of data to function(s). Embodiments described herein apply the Currying principle to e-market data such that the result of evaluation of market data is another function that produces at least one of the following outcomes:

E-cash or other digital asset;
Inference data (new information); or
E-market function (new function that accepts existing data or inference data).

In an example, the market 430 refers to a service the Buyer provides. In the example above, Shoes-R-Us created a service that produced custom fit shoes via a 3D printer. This is, conceptually, what market 430 is trying to capture. In FIG. 4, function F at flow (6), is the Shoes-R-Us service function and market 430 is the website that hosts the user experience involving function F. Market 430 generates e-cash since users are expected to pay using e-cash "script" or with a credit card, which is converted into e-cash script by market 430. Wallet-dm 484 contains the e-cash revenue that is distributed to the other stake holder wallets automatically (as defined by the claims in the Margin Future).

In an illustrative example, a Margin Future M defines how to identify potential Buyers of white cars given location (L), temperature (T) and age range (A); these are referred to as "context" functions. In the example, M is a set of claims that obligates the transfer of data 471 to Buyer 420 and instructs Wallet-dm 484 to pay Investor(s) 450 and Seller(s) 410 when market 430 conditions are met, e.g., when there is revenue. In this example, three sensor data suppliers (Sellers) each may supply a location, a temperature and an age. A Curry function F is defined that binds each data supply to the Margin function:

$F = f(A, f(T, f(L, M(D))))$; for some data set D. Function F may be used to produce e-cash when sold as a good in an e-market. (e.g., an advertiser runs F to produce advertisements that are placed with potential Buyers resulting in car purchases). M describes an expected conversion rate (number of cars that will be sold within a period of time after placement of the ads). A Future function F'=Future(F, conversion), may establish the value (in e-cash) after car sales are booked. Additional results may be netted. For example, F"=Information(F', Historical_data) where F" produces an improved Margin estimate/correction based on analysis of historical data involving Curry function F and Margin Future F'. F" may be used recursively in the e-market to be curried to an appropriate Margin function where the cycle repeats.

In an example, if a data producer (e.g., Seller 410) is trying to find a Buyer to partner with, in a thick market where there are many possible Buyers, the Seller may negotiate for the best deal, based on, for instance, the best commission, who has the best analytics algorithms, who has the best track record (Buyer reputation) or other criteria for risk/reward trade-off.

Buyers and Sellers may undergo several iterations of negotiation before a contract is agreed upon. In an embodiment, the data and exchange market 400 may utilize a Blockchain architecture 490 for recording transactions and initiating payments and fulfillment activities. In a Blockchain architecture, a smart contract may be formed and recorded in the Blockchain ledgers. A "smart contract" is a term of art related to Blockchain technology used to identify a trackable and enforceable agreement between parties. Also known as a cryptocontract, a smart contract may be implemented as a computer program that directly controls the transfer of digital currencies or assets between parties under certain conditions. A smart contract may define the rules and penalties around an agreement in the same way that a traditional contract does, but it may also automatically enforce those obligations by taking information input and assigning value to that input through the rules set out in the contract. Executing the actions required by those contractual clauses may result in information stored in a public ledger in a Blockchain to track performance and initiate automatic payments, or asset exchange, when conditions are met.

Other embodiments may use a central authority to record and enforce transactions. The Curry function may facilitate negotiation refinement by binding (Currying) additional terms. For example, if Seller iteratively negotiates three additional terms in response to Buyer counter negotiations, the series of negotiations may be represented as a Curry function of the form C=Conditions($f(c1_S, c1_B)$, $f'(c2_S, c2_B)$, $f''(c3_S, c3_B)$, . . . ). The condition function may be curried to the Margin function as an additional context function (nested), for instance: $F = f(C, f(A, f(T, f(L, M(D)))))$.

In an embodiment, a Curry function associates a particular data set with a particular algorithm (e.g., executed by a software application) and represents it as a new object. The curried object may be named, for example, in a Margin Future. The named Curry function may be executed such that the Blockchain may record precisely which data item and which functional transformation was applied to the data item.

In existing systems, when a patch or update is applied to a software application, it changes the application—it is no longer the same application. The application version number is typically the way to identify the application. In trusted computing, another technique may be used to identify the application, for instance, a method that computes a cryptographic hash of the application before and after the update. The hash results will differ and a whitelist may be used to associate the hash value with the app and version number.

Embodiments as described herein do away with this hash function. Instead, if an update is needed, it may be applied to the Curry function and produce a new Curry function. Thus, each application version may be identified by a different Curry function identifier. Since the update could have modified the type of data it may consume, a new contract may be negotiated that ensures the right permutation of data/function is agreed to. These changes may result in an improved user experience at the market (430) resulting in a better return on investment. In an embodiment, an Investor 450 may modify the stake in a Margin Future based on changes in the Curry functions used.

In an embodiment, if the update prematurely ended the expected return on investment of the previous generation Margin Future, the loss may be rolled into the subsequent Margin Future. In an example, the Investor 450 may just decide to take the loss and stop investing at that point. In an embodiment any stakeholder may ask to re-negotiate a contract, resulting in a new Margin Future. The new Margin Future may be unchanged from the previous one (except for esoteric tracking) or it may be different based on updated return-on-investment (ROI) parameters.

Figure 5:
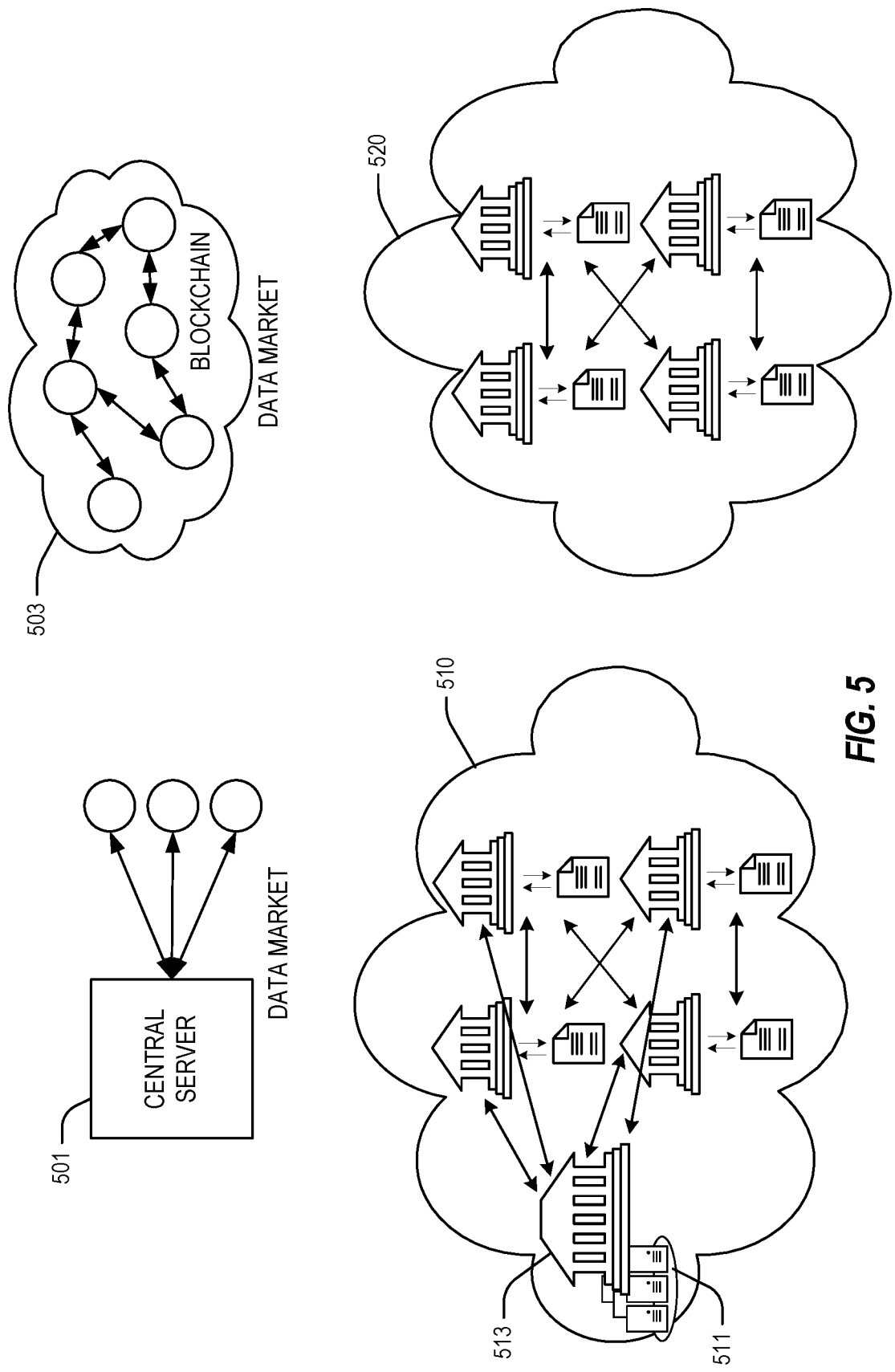
FIG. 5 illustrates example architectures for implementing an online data market and exchange, according to embodiments.

In an embodiment, transactions in the data market exchange 400 may be committed and enforced using a Blockchain 490 with various Blockchain technology implementations. FIG. 5 illustrates alternative architectures for implementing a data market, according to embodiments. In an example, a data market may be hosted as a distributed system 503 on a central server 501. The data market actors may perform e-market transactions involving a central server (client-server) 501 or may involve use of a distributed Blockchain approach 503, where contracts, transactions and other information is distributed and stored among the nodes in the network. In an example, a central server 501 processes transactions and may rely on a central transaction log for consistency. However, this approach may result in a single point of failure. Using a distributed Blockchain approach 503 removes the central point of failure risk. A Blockchain architecture may still have a centralized trust model, however.

The data market, though distributed, may depend on central trust (e.g., key management) architecture 510 utilizing a central authority 513 with a central server 511, or may use a distributed trust mechanism 520 such as Blockchain proof-of-work, proof-of-waiting or proof-of-stake algorithm. Proof-of-work algorithms may ensure that it is equally difficult to cheat as they involve solving NP-hard problems, e.g., non-deterministic polynomial-time hardness. Distributed trust means all nodes must establish consensus trust whenever a trust decision is required. For example, if the data market actors (e.g., elements 410, 420, 430, 440, 450 from FIG. 4) process transactions involving a newly minted wallet key, a consensus of nodes in the Blockchain 520 must agree the new key is trusted.

This trust may be achieved, for example, by having each node attest to the trusted execution environment (TEE)/wallet technology that maintains the key and then circulating the attestation result to verify each obtain the same attestation result.

Each trust node may implement a proof-of-custody and provenance record that may be useful for detecting suspicious and malicious interactions among market participants. One advantage to using Blockchain to host the market is that each participant ensures collusion among the various participants, requiring a threshold (e.g., >50%) before market manipulations may occur. In other embodiments, hosting the data market on a centralized cloud server 511 may have certain performance benefits.

For instance, it may be possible to construct a Blockchain that distributes transactions according to some fault-tolerant byzantine agreement protocol but does not distribute the security component. For example, a central entity 513 may hold a master key that is used to obtain all other keys used in the system. This is commonly the approach existing financial institutions have applied Blockchain technology. Some financial institutions claim such an approach provides higher transaction throughput and offers better user experience, because a user who accidently lost all their funds when their wallet was lost could make a compensating transaction that essentially introduces new currency into the system.

Embodiments may use a distributed approach as in 520 such as an approach that may also distribute the security and trust. In this case, there is no central trusted authority. But typically the added overhead of distributed trust means transaction throughput goes down. Some refer to this distributed security and trust as "diffuse trust."

Figure 6:
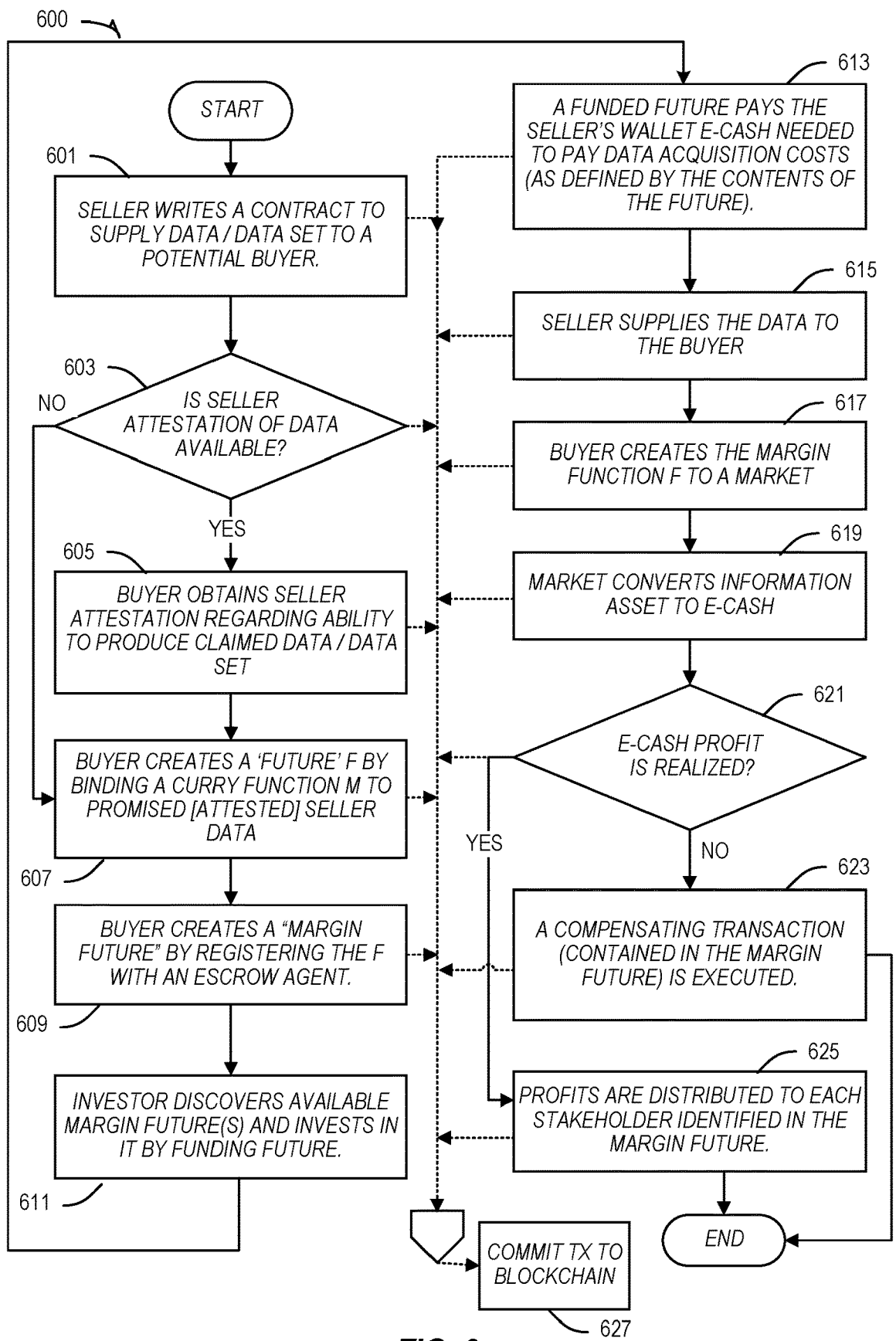
FIG. 6 illustrates a method for implementing an online competitive market and exchange network, according to an embodiment.

FIG. 6 illustrates a flow diagram for a method 600 of operating an online competitive data market exchange, according to an embodiment. It will be understood that FIG. 6 describes a transactions involving both a promise to produce information from the data, as well as actually producing the information. Thus, DP refers to the claim, as described above, while DA refers to the actual data. $D_{PA}$ refers to DA instance(s) that have been curried to a function. In practice, this may result in a new object that may be tracked by the system. DPA refers to this new object. There may be many object instances of a curried data set. Conceptually, one may think of a machine that chops up an infinitely long sausage into bite size sausages with a vacuum sealed wrapper. The sausage is the data, and the wrapper is the Curry function. But each instance of a package has its own serial number.

In an example transaction, processing begins as block 601. It should be noted that dotted lines all go to block 627, where the transaction is committed to the Blockchain. It will be understood that other embodiments may utilize a central authority or hybrid architecture, and that the Blockchain architecture is described for convenience. It will be understood that each intermediate transaction may be recorded to ledgers in the Blockchain, but that trust of the transactions may differ based on whether the data market exchange is operated by a central authority, or a fully distributed protocol, e.g., when a consensus among actors is required. A Seller writes a contract to supply data/data set as a data producer (DP) to a potential Buyer. In this context, a contract is an agreement document digitally signed by both the Seller and Buyer. A determination is made, in block 603, as to whether the Seller attestation of data is available. An attestation may be offered to ensure that the data will be complete, accurate, and robust, as promised in the contract. In an embodiment, data is verified by a third party application. If so, then the Buyer obtains Seller attestation regarding ability to produce claimed data/data set DP (data potential) as DA (data acquired) (block 605). Data D may be expressed as a claim that asserts the ability to produce the data vs. an actual production of the data. A claim may be generated using zero-knowledge (ZK) proof of knowledge. For example, the prover could use ZK to ask the provee to produce the answer to a puzzle that the prover supplies. If the provee can produce the data expected, then the puzzle will produce the correct result. The prover may ask the provee to solve the puzzle multiple times to be convinced the provee can produce the data. In this scenario, the provee does not need to disclose the data to prove he is in possession of the data. This may be sufficient to convince the prover and therefore authorize creation of a claim that may be used to construct the Margin Future.

Processing then continues with block 607. If the attestation is not available, processing also continues at block 607. At block 607, the Buyer creates a Future F by binding a Curry function M to promised (optionally, attested) Seller data, where $D_{PA}(F=MC(D_{PA}))$. It will be understood that the Buyer uses the Curry function to estimate the value of the data, or Future. The Margin function may be used to generate a data set provision guarantee. If the Margin function and Future do not show that the data has enough value to provide a return on investment to all actors, the Buyer may negotiate a lower price or cancel a conditional contract before receiving the data. The Buyer creates a Margin Future by registering the Future F with an escrow agent, at block 609. An Investor discovers the available Margin Future, perhaps through a broadcast request or optionally searching for viable investment options. In a Blockchain architecture, offers for data or information may be recorded in the Blockchain, or as an abstraction over the Blockchain. A member of the data market exchange may search for recent offerings within the Blockchain. In a centralized architecture various methods may be used to post or broadcast the offers, for instance using APIs, so that members may discover the available offerings. The Investor may invest in the discovered Margin Future by funding it (e.g., transferring e-cash to the escrow agent's Margin Future wallet), in block 611. Funded Future F pays the Seller's wallet the e-cash needed to pay for the data acquisition costs, as defined by the contents of the Future F, in block 613. The Seller supplies the data DPA to the Buyer in block 615. And the Buyer creates the Margin Function $(F=Mc(D_{PA}))$ to a market, in block 617. This action may be seen as the Buyer supplying the value added data as "information" to the market for information consumers. The market then converts the information asset to e-cash, or other digital currency/asset in block 619, e.g., providing to information consumers and receiving payments to the market.

A determination is made, in block 621, as to whether a profit of e-cash has been realized. If not, then a compensating transaction, as defined in the Margin Future, is executed, in block 623. For example, escrow funds, less cost, is returned to Investors. Various algorithms may be used to distribute or assign a loss. In an embodiment, this algorithm may be negotiated in the initial agreement. In an embodiment, the distribution of profits or loss may be bundled with the Margin Future and maintained by the escrow agent. Profits are then distributed to each stakeholder identified in the Margin Future, in block 625. In an embodiment, payment, or the withholding of payments due to a loss or failure to perform, may be enforced by the recorded Blockchain transactions. In an example, payment may be made automatically once a completion transaction has been recorded, leveraging the architecture of using a Blockchain smart contract for the initial contract.

It will be understood that margins and futures are concepts used in traditional commodity and stock markets. However, traditional stock markets do not operate in the same way as an information exchange, as described herein. For instance, commodities are real goods, whereas the embodiments described herein treat a more intangible, or electronic good, e.g., data and information, as a commodity.

Stocks are investments in enterprises (e.g., a non-person legal entity), and the issuance of "stocks," resulting in shared ownership of the enterprise. A data or information exchange, as described herein, allows investment in a binding of some data set with a Curry function that produces a result believed to have intrinsic value that may be realized via electronic service offerings (e.g., X-as-a-service). No enterprise is needed other than some form of service hosting platform such as a public or private Web service, or server.

Investments in commodities "futures" for example, are a method for capturing Investor dollars indexed to the price of goods (e.g., hard winter wheat). If the price goes higher than the anticipated price in the future, the Investor may sell the future for a profit. With the approach described herein, there is no need for a commodity exchange that sets the price of goods. Instead, futures are expressed in terms of expected return on investment. The Buyer and Investor agree to the terms directly, no other formal entity (commodity exchange) is needed. Further, embodiments of the information market are distributed, having "diffuse trust," whereas existing approaches either centralize all or a portion of the exchange. In an embodiment, existing e-currency solutions such as bitcoin do not define an information market.

FIG. 6 illustrates electronic currency payments in an example data exchange network, according to an embodiment. The data market 430 as described herein may be seen as its own entity, with its own e-wallet 484. In an embodiment, electronic payments are made to the market wallet 484 and the distributed to the appropriate parties. Once a contract has been negotiated between the Seller 410 and the Buyer 420, the Buyer 420 provides the Margin and Future information with the escrow agent 440 to acquire an Investor 450. The escrow agent is an intermediary to help broker the investment and hold the Margin and Future information. Once the data has been transferred from Seller 410 to Buyer 420, value added based on the Curry functions by the Buyer 420, the value added data may be distributed for realized payment (not shown in the figures). In order to realize the value of the data in the market, one or more information consumers 601 consume the data and send payment from wallet 611 to the data market wallet 484. The realized value is provided to the market 430, and payments are distributed to the Seller 410, Buyer 420, escrow agent 440 (e.g., transaction fees), and Investor 450, as described above. The actors' respective wallets (e-cash) 481, 485, 483, 482 may be automatically credited by the data market wallet 484 upon completion of the transaction.

In an embodiment, digital payments may be made in digital assets other than e-currency. For instance, personal, financial, or transactional information about the information consumer may be used to trade for the information available in the market. Any digital data or information that is deemed valuable by a party may be used as currency trade. In an example transaction e-wallets may maintain more than one type of digital currency based on the payments requested by other entities in the transaction chain. A single chain of transactions from data supplier, Buyer, Investor, escrow agent, and consumer may comprise more than one type of digital asset for payment at each step in the transaction chain.

Figure 7:
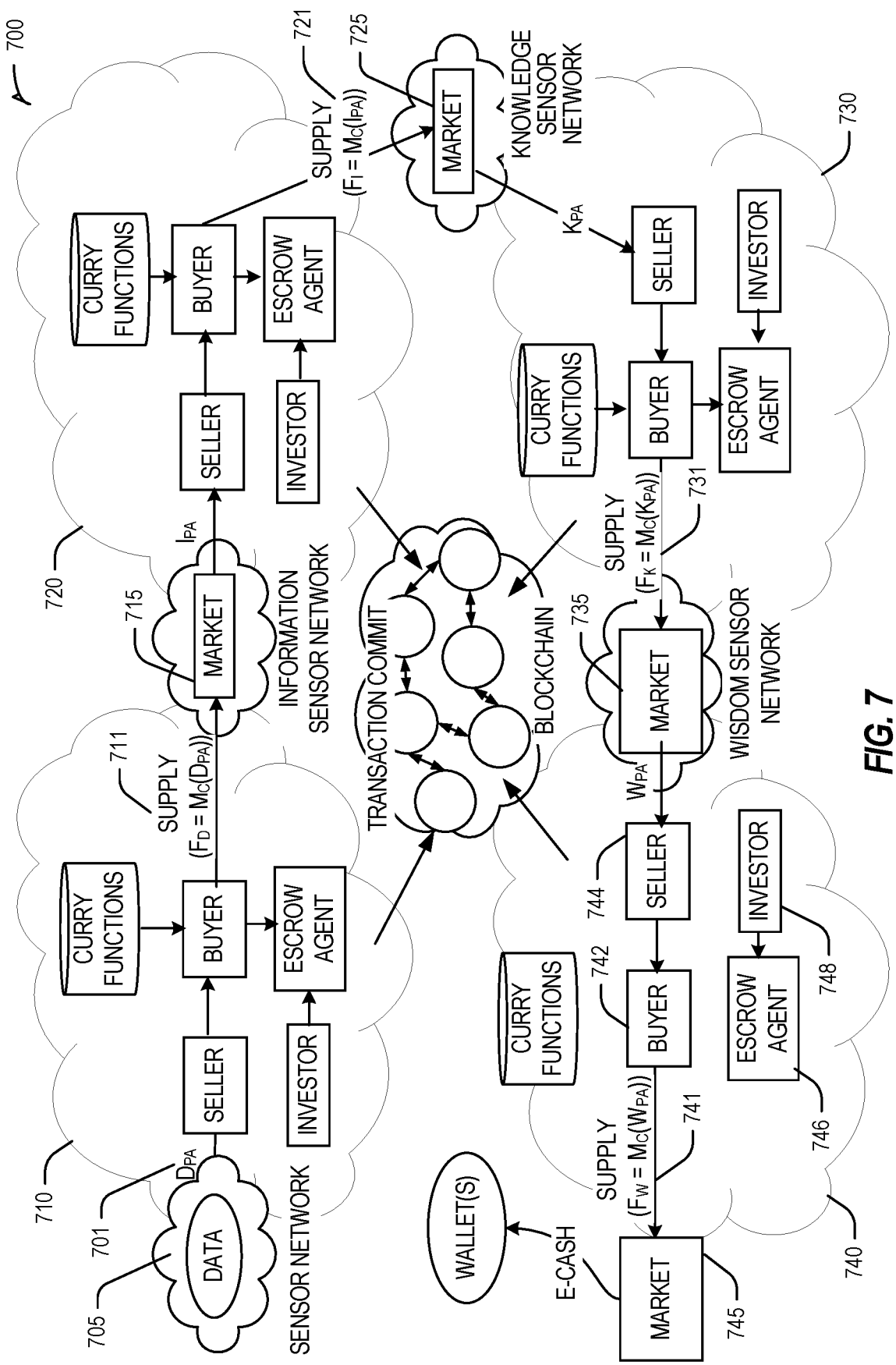
FIG. 7 illustrates a layered system of interconnected e-markets which trade in data, information, knowledge and wisdom products, according to an embodiment.

FIG. 7 illustrates a layered system of interconnected e-markets which trade in data, information, knowledge, and wisdom products, according to an embodiment. In an embodiment, the e-Market 700 includes a hierarchy of e-markets 710, 720, 730, 740 following the DIKW model, where an IoT network (e.g. sensor network 705) supplies data to a data market 710, similar to the data market 400 in FIG. 4, may produce as one of its outputs structured information 711 having contextual metadata useful for performing analytics. The information market 720 may use the analytics 711 as supplied as an information sensor network 715 to produce knowledge 721. The knowledge 721 may be supplied as a knowledge sensor network 725 to a knowledge market 730 where deep learning, AI and other problem solving techniques produce wisdom 731 that may supplied in a wisdom sensor network 735 as input to a wisdom market 740. The wisdom market 740 may utilize methods for both simulation and robot experiential feedback used in connection with experiential pattern matching methods to produce computer wisdom 741. A wisdom market 740 may follow much the same internal structure as the previous e-markets 710, 720, 730 in the hierarchy 700.

As discussed in context of FIG. 4, each e-market layer in the hierarchy 700 will typically include a set of actors (e.g., as for the wisdom market 740, Seller 744, Buyer 742, Investor 748, Escrow Agent 746 and Data Market 745); a set of electronic wallets (not shown) corresponding to the actors respectfully; and a data source such as a Sensor Network 705, 715, 725, 735.

Figure 8:
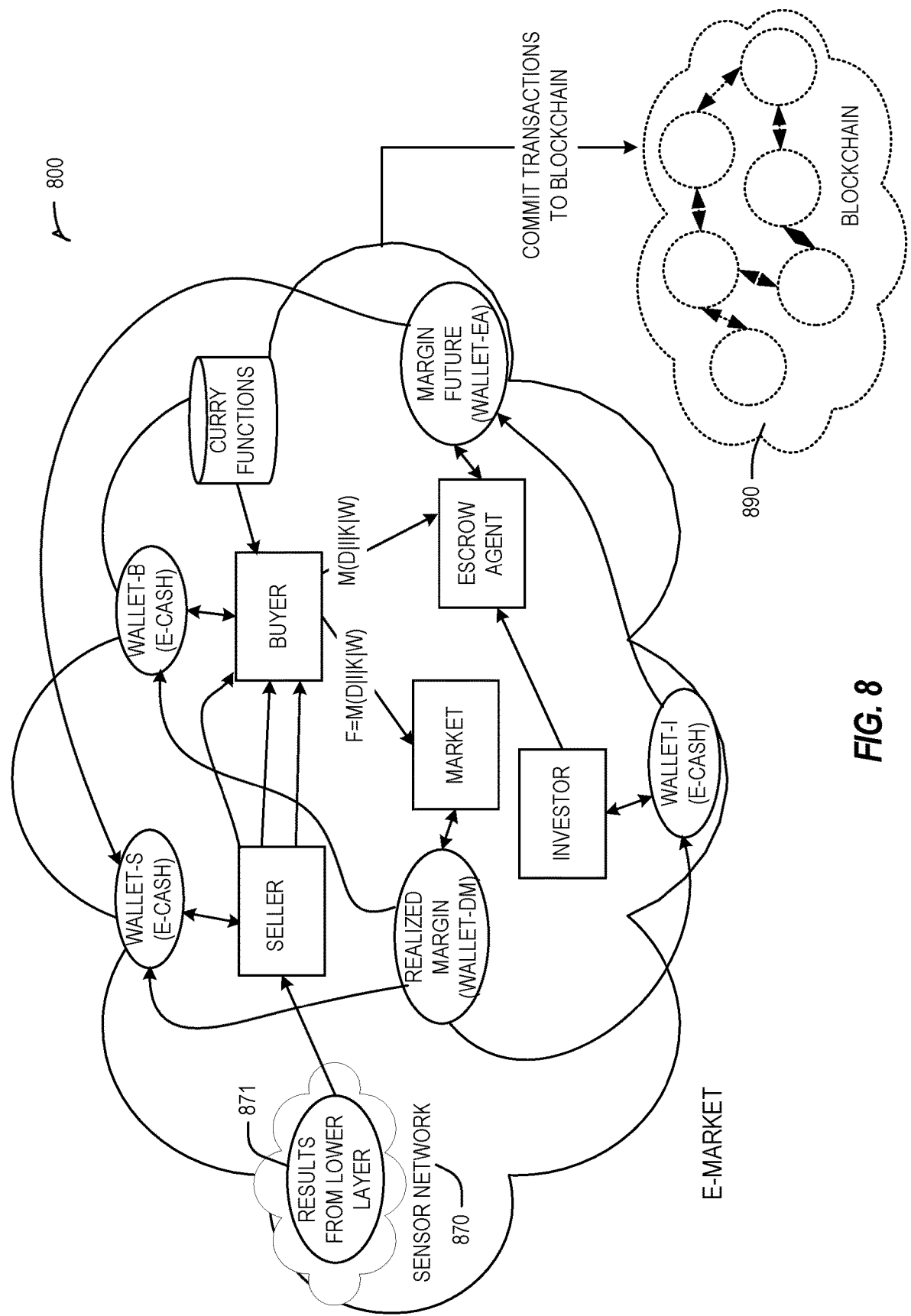
FIG. 8 illustrates a generic layered market of the interconnected e-markets of FIG. 7, according to an embodiment.

FIG. 8 illustrates a generalized network for a DIKW network as would be applied to each layer in the hierarchical e-market, according to an embodiment. The components of FIG. 8 are similar to those shown in FIG. 4 for the data-information market 400. However, the type of content supplied by the sensor network 870 differs based on which market is being represented. For instance, in the data market 710 (FIG. 7), sensor network 870 may comprise an IoT or fog network to provide sensor information 701 to the data market 710. For information market 720, sensor network 870 may comprise a set of information 711 generated by Currying the data received from the sensor network 705. For the knowledge market 730, sensor network 870 may comprise a set of knowledge 721 generated by Currying the information received from the sensor network 715. For the wisdom market 740, sensor network 870 may comprise a set of wisdom 731 generated by Currying the knowledge received from the sensor network 725.

While applying a similar approach to the information market of FIG. 4, the e-market 800 is not specific to the single e-market description. Embodiments herein describe a classification and interoperation of e-markets based on a type of data and Margin function where "data," "Information," "Knowledge," and "Wisdom" are intended to have similar primitive e-market operations and building blocks, but where the Margin functions differ for each e-market input; whether 'data', 'information', 'knowledge' and 'wisdom'. Furthermore, the relationship between e-markets may be characterized as recursive, meaning at least one result of a more primitive e-market may be the input to a more sophisticated e-market.

For example, the method for producing, as an output of a first e-market, an input for a second e-market where the second e-market input may satisfy the input requirements of "Margin" functions suitable for Information, Knowledge or Wisdom e-markets, respectfully.

DIKW E-Market Currying

A DIKW E-market uses Currying to bind an input 871 (e.g., results from a lower layer or sensor network) to a Margin function: M=f (D|I|K|W); where (D, I, K and W) are respectively inputs for a DIKW hierarchical e-market.

MD, MI, MK and MW, respectfully, describe the Margin functions suitable for each e-market such that:

MD=$f_D$(D), e.g., MD as a function of data;
MI=$f_I$(I) e.g., MI as a function of information;
MK=$f_K$(K), e.g., MK as a function of knowledge; and
MW=$f_W$(W), e.g., MW as a function of wisdom.

Embodiments herein rely on the set of Curry functions that produce a result that is a suitable input to a next layer DIKW e-market Margin function such that:

$M_W = f_W(f_K(f_I(f_D(D))))$ where D is the datum suitable for the Curry function.

The Margin function appropriate for a system of DIKW e-markets may be recursive in that the Wisdom Margin function MW may be defined in terms of a Knowledge Margin function MK, which may be further defined in terms of an Information Margin function MI, which may be further defined in terms of a Data Margin function MD. Execution of the Wisdom Margin function may involve exchanging transactions in each of lower layer e-markets as pre-requisites. Similarly, the investment Future of the Wisdom e-market may be contingent on successful execution of lower-layer e-market Margin functions but may not otherwise be tied to Futures of lower-layer e-markets as it may be the case that intermediate results have little or no value in lower-layer e-markets given a higher-layer e-market context.

DIKW E-Market Example

In an example, location data D is combined with a location tracking Curry function MD to produce a graph (I) of movements of pets in a suburban area. A Curry function MI uses the graph (I) to track pet movements over a 12 month period and produces a behavioral pattern (K) that reveals popular pet recreational "events" that are otherwise unscheduled. A Curry function MK uses the pet behavior pattern K to produce an epidemiology result W, which predicts an infection outbreak among domesticated pets in suburban areas. A margin function, MW therefore may be used to predict an outbreak of a specific pet disease in a specific suburban area. This e-asset of a Wisdom e-market (e.g., the prediction of a specific infection outbreak in a specific area) may be interesting to antivirus providers, pet care providers and municipal governments who may each purchase a stake in the e-asset to provide better products, care and livability conditions.

E-asset quality may be measured in terms of provenance and auditability by reviewing the chain of transactions in a blockchain 890 "recording" that may be used to re-construct the Margin function MW by interested stakeholders.

An embodiment may be driven by advertising but is not required. Existing e-markets; social media etc. may be driven by advertising, resulting in unfairly disadvantaged stakeholders, which may be seen as victims of the existing e-market approach.

Figure 9A:
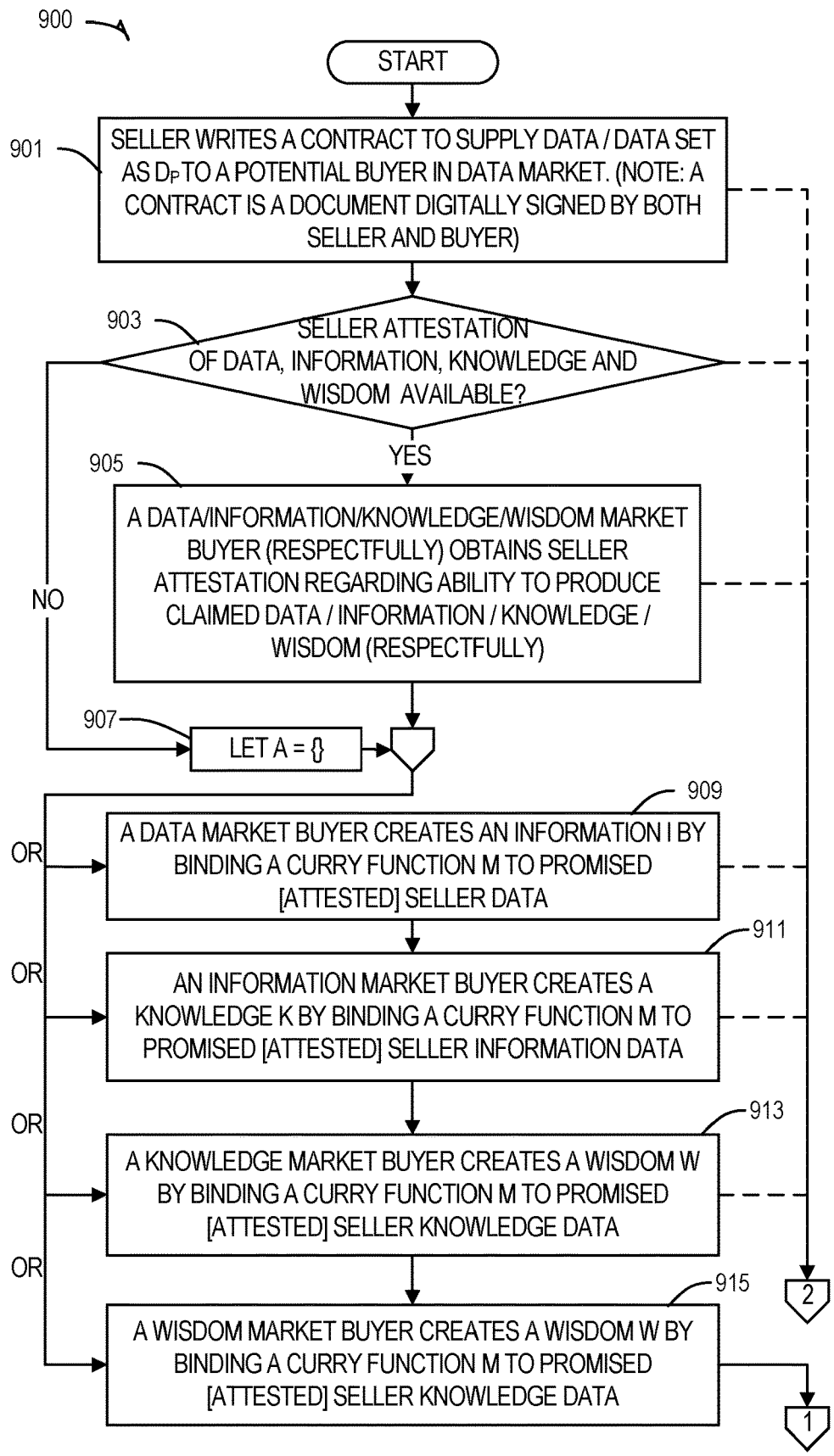
FIGS. 9A-B illustrate a method for implementing a layered Data, Information, Knowledge, Wisdom (DIKW) network, according to an embodiment.
Figure 9B:
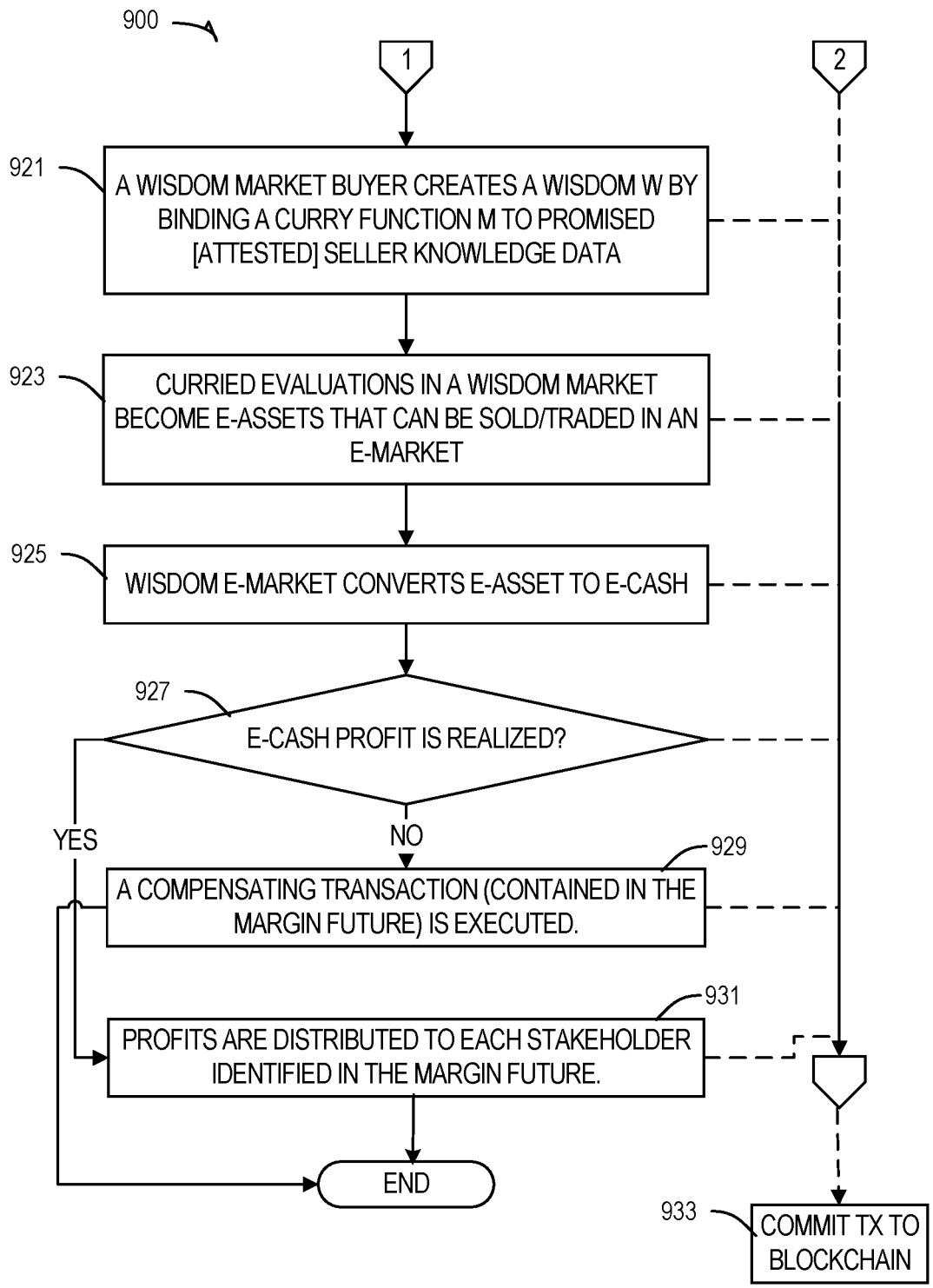

FIGS. 9A-B illustrate a method for implementing a layered data, information, knowledge, wisdom (DIKW) network, according to an embodiment. The method 900 of FIGS. 9A-B illustrates expected interactions between DIKW e-markets where the output of a lower-layer e-market may produce an outcome acceptable as information, knowledge or wisdom inputs to a next higher layer e-market. The Curry function in the form of a Margin equations, however, are specific to the type of e-market. In other words, only a Margin equation that operates on Information input is appropriate for an "information" e-market.

Nevertheless, it is anticipated that Margin equations may produce other outputs suitable for lower or current layer e-markets. For example, an embodiment expects a knowledge market produces knowledge, which is an expected input to a wisdom market. In other embodiments, it may also be true that another output of a knowledge market is information and/or data, which are may be inputs to additional data and information e-markets in the hierarchical layered e-market network. It is not expected, however, that an information market will have wisdom as an output, because the Margin function that produces a W output is classified as a Knowledge Margin. It also may be true that in an example, an information margin function may require inputs from two different data sensor networks, or that a knowledge margin may require curried inputs from more than one information network, etc. The various transactions between and among e-markets may be captured in a tamper resistant distributed ledger (i.e. blockchain) for provenance and auditability. Additionally any interoperability in the data formats across the markets may be captured in the blockchain.

For purposes of illustration and simplicity, the following discussion uses the terminology (D|I|K|W) to indicate one of data, information, knowledge or wisdom. In this way, the various activities of the e-markets that are similar for various e-markets may be described once instead of identical repetition.

Referring again to FIG. 9A, in an embodiment, for a data market example, Seller writes a contract to supply data/data set as DP to a potential Buyer in data market, in block 901. It should be noted that in this context a contract is a document digitally signed by both Seller and Buyer which defines terms and conditions of the data transfer. It is then determined whether Seller attestation of (D|I|K|W), depending on the actual e-market layer, is available, in block 903. An attestation may be offered to ensure that the (D|I|K|W) will be complete, accurate, and robust, as promised in the contract. In an embodiment, (D|I|K|W) is verified by a third party application.

In an example, Data D may be expressed as a claim that asserts the ability to produce the data vs. an actual production of the data. A claim may be generated using zero-knowledge (ZK) proof of knowledge. For example, the prover could use ZK to ask the provee to produce the answer to a puzzle that the prover supplies. If the provee can produce the data expected, then the puzzle will produce the correct result. The prover may ask the provee to solve the puzzle multiple times to be convinced the provee can produce the data. In this scenario, the provee does not need to disclose the data to prove he is in possession of the data. This may be sufficient to convince the prover and therefore authorize creation of a claim that may be used to construct the Margin Future.

If there is Seller attestation, then the (D|I|K|W) Buyer obtains the Seller attestation regarding ability to produce claimed (D|I|K|W) where DP is qualified as $D_{PA}$ and $I_P$ as $I_{PA}$ and $K_P$ as $K_{PA}$ and $W_P$ and $W_{PA}$, in block 905. When there is no attestation available then the attestation A is set to an empty/null set in block 907 and has the effect of assigning the node to a SYSTEM_LOW security level.

Successful attestations may have the effect of elevating a security level and of synchronizing or finding agreement regarding a security level that spans multiple nodes. For example, if a node achieves a security level of MODERATE and all other nodes achieve a level of HIGH then the effective security level for all nodes is MODERATE. However, if the node at MODERATE goes offline for a period of time, the remaining nodes may upgrade the system wide security level to HIGH. There may be a class of transactions that may only be cleared at a system level HIGH, hence the absence of the MODERATE node results in an ability to respond to the class of transactions requiring HIGH security.

Depending on the e-market layer, processing continues at one of blocks 909, 911, 913 or 915. A difference in processing by e-market layer is the Curry function used with the margin functions to generate content to be used at inputs at the next level. For instance, at the data market layer, a Buyer creates an Information I by binding a Curry function M to promised [attested] Seller data, $D_{PA}$ ($I=M_D(D_{PA})$), in block 909.

An Information Market Buyer creates a Knowledge K by binding a Curry function M to promised [attested] Seller Information data $D_{PA}$, ($K=M_I(I_{PA})$), in block 911. A Knowledge Market Buyer creates a Wisdom W by binding a Curry function M to promised [attested] Seller Knowledge data $KID_{PA}$, ($WPA=M_K K_{PA}$)), in block 913. And a Wisdom Market Buyer creates a Wisdom W by binding a Curry function M to promised [attested] Seller Knowledge data $KID_{PA}$, (E-ASSET$_W=M_W(W_{PA})$), in block 915.

Now referring to FIG. 9B, processing for intermediate layer e-markets may continue at connector 2, where the transactions are committed to ledgers in the Blockchain 933. For a Wisdom e-market, processing may continue at block 921. A Wisdom Market Buyer creates a Wisdom W by binding a Curry function M to promised [attested] Seller Knowledge data $KID_{PA}$, E-ASSET$_W=M_W(W_{PA})$), in block 921. The curried evaluations in a Wisdom market become e-assets that may be sold/traded in an e-market, in block 923.

As discussed above in FIG. 4 for a single data market, the Wisdom e-market may convert the e-assets into e-cash, or other electronic payment or digital currency or trade, in block 925. If e-cash profits are realized as determined in block 927, then the profits may be distributed to each stakeholder as identified in the margin future, at block 931. If there is not a profit, then a compensating transaction, as defined in the margin future may be executed, in block, 931. At each activity or transaction, the event or transaction is committed to the Blockchain, at block 933.

Figure 10:
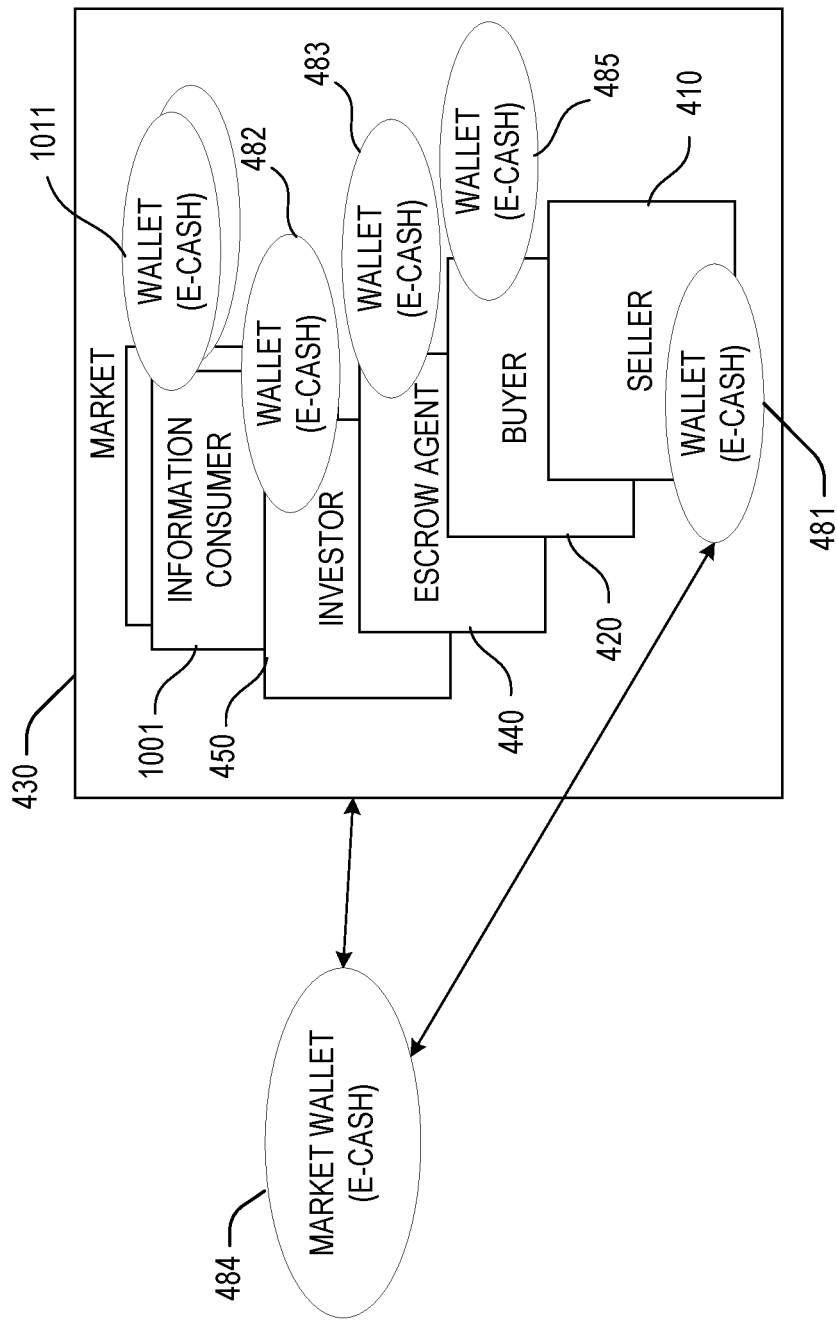
FIG. 10 illustrates electronic currency payments in an example data exchange network, according to an embodiment.

FIG. 10 illustrates electronic currency payments in an example data exchange network, according to an embodiment. The data market 430 as described herein may be seen as its own entity, with its own e-wallet 484. The example show is for a data market as depicted in FIG. 4. It will be understood that the components of FIG. 10, and their operation, may be generalized for any layer in the e-market 700, with slight adaption. In an embodiment, electronic payments are made to the market wallet 484 and the distributed to the appropriate parties. Once a contract has been negotiated between the seller 410 and the buyer 420, the buyer 420 provides the Margin and Future information with the escrow agent 440 to acquire an investor 450. The escrow agent 440 is an intermediary to help broker the investment and hold the Margin and Future information. Once the data has been transferred from seller 410 to buyer 420, value added based on the Curry functions by the buyer 420, the value added data may be distributed for realized payment (not shown in the figures). In order to realize the value of the data in the market, one or more information consumers 1001 consume the data and send payment from wallet 1011 to the data market wallet 484. The realized value is provided to the market 430, and payments are distributed to the seller 410, buyer 420, escrow agent 440 (e.g., transaction fees), and investor 450, as described above. The actors' respective wallets (e-cash) 481, 485, 483, 482 may be automatically credited by the data market wallet 484 upon completion of the transaction.

In an embodiment, digital payments may be made in digital assets other than e-currency. For instance, personal, financial, or transactional information about the information consumer may be used to trade for the information available in any level of the e-market. Any digital data or information that is deemed valuable by a party may be used as currency trade. In an example transaction e-wallets may maintain more than one type of digital currency based on the payments requested by other entities in the transaction chain. A single chain of transactions from data supplier, buyer, investor, escrow agent, and consumer may comprise more than one type of digital asset for payment at each step in the transaction chain. Further, payments at different layers may be made with differing types of currency.

In other examples, the operations and functionality described above with reference to FIGS. 4 to 10 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 11:
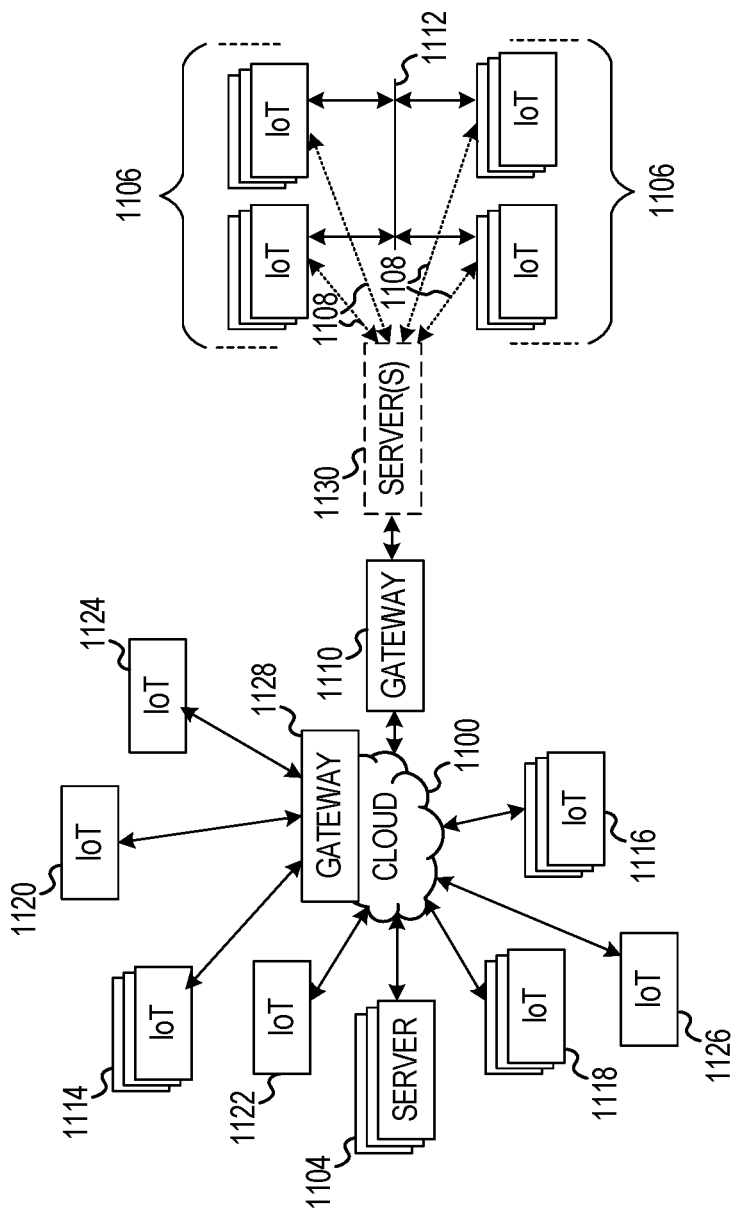
FIG. 11 illustrates a block diagram of a network illustrating communications among a number of IoT devices, according to an example.

FIG. 11 illustrates a drawing of a cloud computing network, or cloud 1100, in communication with a number of Internet of Things (IoT) devices. The cloud 1100 may represent the Internet, or may be a local area network (LAN), or a wide area network (WAN), such as a proprietary network for a company. The IoT devices may include any number of different types of devices, grouped in various combinations. For example, a traffic control group 1106 may include IoT devices along streets in a city. These IoT devices may include stoplights, traffic flow monitors, cameras, weather sensors, and the like. The traffic control group 1106, or other subgroups, may be in communication with the cloud 1100 through wired or wireless links 1108, such as LPWA links, optical links, and the like. Further, a wired or wireless sub-network 1112 may allow the IoT devices to communicate with each other, such as through a local area network, a wireless local area network, and the like. The IoT devices may use another device, such as a gateway 1110 or 1128 to communicate with remote locations such as the cloud 1100; the IoT devices may also use one or more servers 1130 to facilitate communication with the cloud 1100 or with the gateway 1110. For example, the one or more servers 1130 may operate as an intermediate network node to support a local edge cloud or fog implementation among a local area network. Further, the gateway 1128 that is depicted may operate in a cloud-to-gateway-to-many edge devices configuration, such as with the various IoT devices 1114, 1120, 1124 being constrained or dynamic to an assignment and use of resources in the cloud 1100.

Other example groups of IoT devices may include remote weather stations 1114, local information terminals 1116, alarm systems 1118, automated teller machines 1120, alarm panels 1122, or moving vehicles, such as emergency vehicles 1124 or other vehicles 1126, among many others. Each of these IoT devices may be in communication with other IoT devices, with servers 1104, with another IoT fog device or system (not shown, but depicted in FIG. 2), or a combination therein. The groups of IoT devices may be deployed in various residential, commercial, and industrial settings (including in both private or public environments).

As may be seen from FIG. 11, a large number of IoT devices may be communicating through the cloud 1100. This may allow different IoT devices to request or provide information to other devices autonomously. For example, a group of IoT devices (e.g., the traffic control group 1106) may request a current weather forecast from a group of remote weather stations 1114, which may provide the forecast without human intervention. Further, an emergency vehicle 1124 may be alerted by an automated teller machine 1120 that a burglary is in progress. As the emergency vehicle 1124 proceeds towards the automated teller machine 1120, it may access the traffic control group 1106 to request clearance to the location, for example, by lights turning red to block cross traffic at an intersection in sufficient time for the emergency vehicle 1124 to have unimpeded access to the intersection.

Clusters of IoT devices, such as the remote weather stations 1114 or the traffic control group 1106, may be equipped to communicate with other IoT devices as well as with the cloud 1100. This may allow the IoT devices to form an ad-hoc network between the devices, allowing them to function as a single device, which may be termed a fog device or system (e.g., as described above with reference to FIG. 2).

Figure 12:
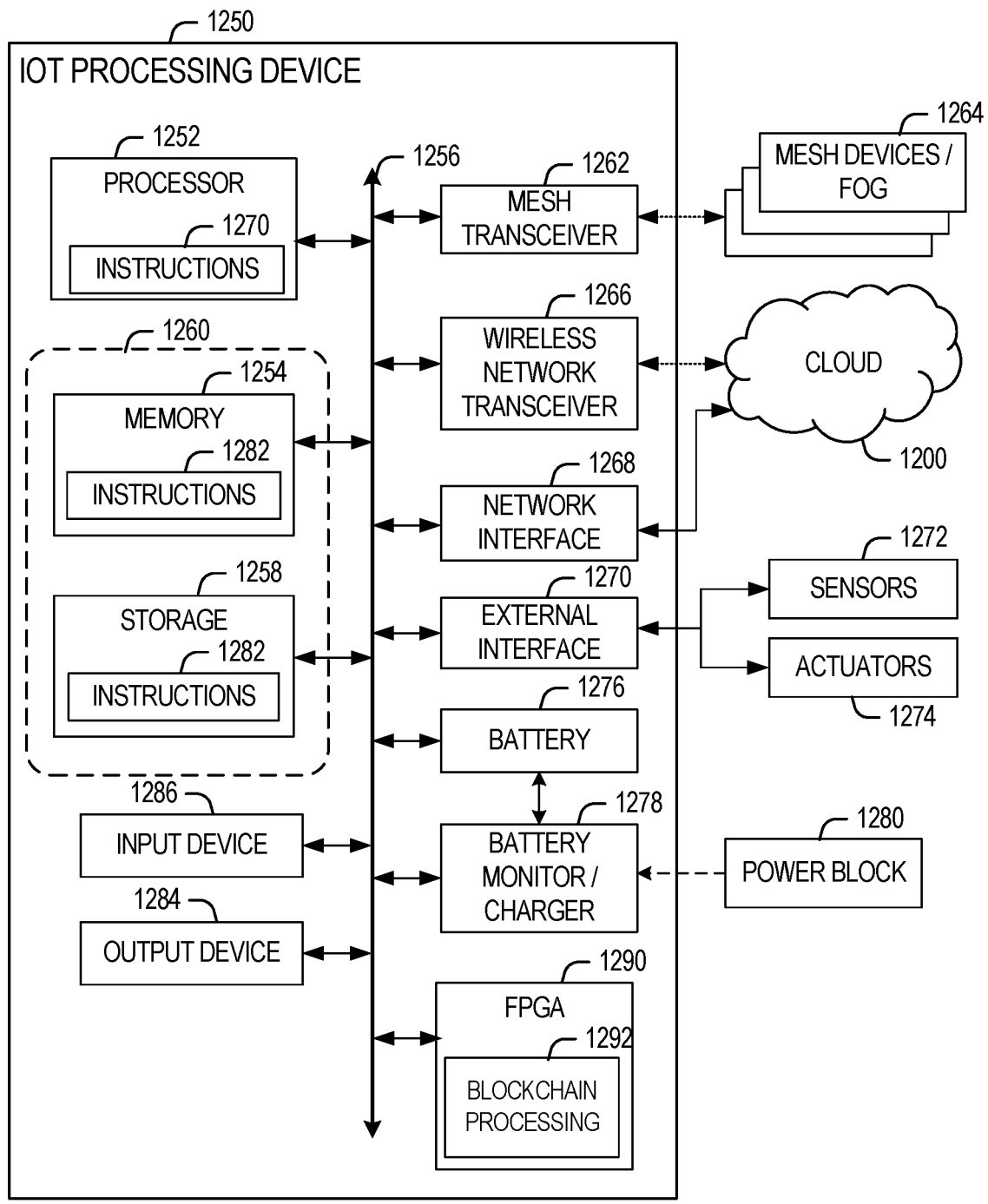
FIG. 12 illustrates a block diagram for an example IoT processing system architecture upon which any one or more of the techniques (e.g., operations, processes, methods, and methodologies) discussed herein may be performed, according to an example.

FIG. 12 is a block diagram of an example of components that may be present in an IoT device 1250 for implementing the techniques described herein. The IoT device 1250 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1250, or as components otherwise incorporated within a chassis of a larger system. Additionally, the block diagram of FIG. 12 is intended to depict a high-level view of components of the IoT device 1250. However, some of the components shown may be omitted, additional components may be present, and different arrangement of the components shown may occur in other implementations.

The IoT device 1250 may include a processor 1252, which may be a microprocessor, a multi-core processor, a multithreaded processor, an ultra-low voltage processor, an embedded processor, or other known processing element. The processor 1252 may be a part of a system on a chip (SoC) in which the processor 1252 and other components are formed into a single integrated circuit, or a single package, such as the Edison™ or Galileo™ SoC boards from Intel. As an example, the processor 1252 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1252 may communicate with a system memory 1254 over an interconnect 1256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example the storage 1258 may be implemented via a solid state disk drive (SSDD). Other devices that may be used for the storage 1258 include flash memory cards, such as SD cards, microSD cards, xD picture cards, and the like, and USB flash drives. In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in a SoC based system. Other bus systems may be included, such as an I2C interface, an SPI interface, point to point interfaces, and a power bus, among others.

The interconnect 1256 may couple the processor 1252 to a mesh transceiver 1262, for communications with other mesh devices 1264. The mesh transceiver 1262 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1264. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1262 may communicate using multiple standards or radios for communications at different range. For example, the IoT device 1250 may communicate with close devices, e.g., within about 10 meters, using a local transceiver based on BLE, or another low power radio, to save power. More distant mesh devices 1264, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1266 may be included to communicate with devices or services in the cloud 1200 via local or wide area network protocols. The wireless network transceiver 1266 may be a LPWA transceiver that follows the IEEE 802.15.4, or IEEE 802.15.4 g standards, among others. The IoT device 1250 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1262 and wireless network transceiver 1266, as described herein. For example, the radio transceivers 1262 and 1266 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1262 and 1266 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g., a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1266, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1268 may be included to provide a wired communication to the cloud 1200 or to other devices, such as the mesh devices 1264. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to allow connect to a second network, for example, a NIC 1268 providing communications to the cloud over Ethernet, and a second NIC 1268 providing communications to other devices over another type of network.

The interconnect 1256 may couple the processor 1252 to an external interface 1270 that is used to connect external devices or subsystems. The external devices may include sensors 1272, such as accelerometers, level sensors, flow sensors, optical light sensors, camera sensors, temperature sensors, a global positioning system (GPS) sensors, pressure sensors, barometric pressure sensors, and the like. The external interface 1270 further may be used to connect the IoT device 1250 to actuators 1274, such as power switches, valve actuators, an audible sound generator, a visual warning device, and the like.

In some optional examples, various input/output (I/O) devices may be present within, or connected to, the IoT device 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1250.

A battery 1276 may power the IoT device 1250, although in examples in which the IoT device 1250 is mounted in a fixed location, it may have a power supply coupled to an electrical grid. The battery 1276 may be a lithium ion battery, or a metal-air battery, such as a zinc-air battery, an aluminum-air battery, a lithium-air battery, and the like.

A battery monitor/charger 1278 may be included in the IoT device 1250 to track the state of charge (SoCh) of the battery 1276. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1278 may communicate the information on the battery 1276 to the processor 1252 over the interconnect 1256. The battery monitor/charger 1278 may also include an analog-to-digital (ADC) convertor that allows the processor 1252 to directly monitor the voltage of the battery 1276 or the current flow from the battery 1276. The battery parameters may be used to determine actions that the IoT device 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the IoT device 1250. A wireless battery charging circuit, such as an LTC4020 chip from Linear Technologies of Milpitas, Calif., among others, may be included in the battery monitor/charger 1278. The specific charging circuits chosen depend on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine readable medium 1260 including code to direct the processor 1252 to perform electronic operations in the IoT device 1250. The processor 1252 may access the non-transitory, machine readable medium 1260 over the interconnect 1256. For instance, the non-transitory, machine readable medium 1260 may be embodied by devices described for the storage 1258 of FIG. 12 or may include specific storage units such as optical disks, flash drives, or any number of other hardware devices. The non-transitory, machine readable medium 1260 may include instructions to direct the processor 1252 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

In an embodiment, network interface device 1268 may include instructions to implement Blockchain functionality as embedded instructions. Similarly, it should be understood that instructions to implement the Blockchain functionality may be implemented as instructions 1282 in machine readable storage medium 1258, in a secure or isolated storage area. For instance, instructions 1282 may be encrypted when outside of a TEE or secure embedded controller such as network interface 1268. In an embodiment, a field programmable gate array (FGPA) 1290 may be programmed to implement the Blockchain functionality 1292, or other subsystem implementing a portion of the functionality described herein. In an embodiment, the FPGA 1290 may be connected through a subsidiary bus to memory 1260, or any of the network controllers 1262, 1266, 1268, or both. In an example, the FPGA 1290 may have direct memory access to communications buffers.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional Notes and Examples

Examples may include subject matter such as a method, means for performing acts of the method, at least one machine-readable medium including instructions that, when performed by a machine cause the machine to performs acts of the method, or of an apparatus or system for operating a network for a data market and exchange, according to embodiments and examples described herein.

Example 1 is an apparatus for providing value added content in a hierarchical layered network, comprising: a first node having a processor communicatively coupled to a storage device including instructions that when executed by the processor, cause the processor to: receive content from a second node in a transaction via the network, wherein the first node and second node generate a set of rules and criteria associated with the transaction, and wherein the set of rules and criteria are registered with a third node on the network, and stored in a plurality of distributed public ledgers; generate a future value estimate as a function of the received content and a Curry function accessible to the first node; provide at least one additional node on the network access to the future value estimate; apply the Curry function to the received content to generate value added content; provide the value added content to at least one of: a node operating at a higher layer of the network for use as input to a second Curry function, or to a consumer node at a final layer of the network; and exchange resources recorded in a secure data store, wherein the exchange of resources depends on the future value estimate and a realized value of the value added content, and is enforced by the set of rules and criteria registered with the third node.

In Example 2, the subject matter of Example 1 optionally includes an electronic wallet coupled to the secure data store to effect the exchange of resources, wherein the electronic wallet is configured to send and receive digital currency over the network, wherein responsive to the receiving the content, the electronic wallet is arranged to send a payment resource to the second compute node via the network, the payment resource defined according to the set of rules and criteria associated with the transaction, and wherein responsive to the realized value of the value added content, wherein the realize value results from digital payments made in purchase of the value added content, the electronic wallet is arranged to receive digital currency according to conditions defined by future value estimate regarding disbursement of digital currency payments made for consumption of the value added content.

In Example 3, the subject matter of any one or more of Examples 1-2 optionally include wherein the content differs in type based on from which layer of the hierarchical network the content is received, and wherein the hierarchical network includes at least one of a sensor network, an information sensor network, a knowledge sensor network, or a wisdom sensor network, wherein the value added content differs in type based on the content type and the Curry function used to add value to the content, and wherein the value added content comprises a type of either information, knowledge or wisdom, as derived from at least one content of a type data, information or knowledge, respectively.

In Example 4, the subject matter of any one or more of Examples 1-3 optionally include wherein the Curry function is available from a third party, for a digital payment.

In Example 5, the subject matter of any one or more of Examples 1-4 optionally include wherein the digital currency exchange is brokered through a market compute node on the network, the market compute node arranged to receive the resources exchanged in the network, disburse resources resulting from the realized value of the value added content to electronic wallets associated with one or more of the compute nodes involved in the transaction of adding value to the content, the disbursement calculated according to conditions associated with the set of rules and criteria and the future value estimate.

In Example 6, the subject matter of any one or more of Examples 1-5 optionally include wherein a transaction over the network is made using Blockchain technology and the transaction is published in a ledger accessible to nodes on the network.

In Example 7, the subject matter of any one or more of Examples 1-6 optionally include wherein a compute node on the network may participate in transactions in more than one layer in the hierarchical layered network.

Example 8 is at least one computer readable storage medium having instructions stored thereon, the instructions when executed on a first compute node in a hierarchical layered network, cause the first compute node to: receive content from a second compute node in a transaction via the network, wherein the first compute node and second compute node generate a set of rules and criteria associated with the transaction, and wherein the set of rules and criteria are registered with a third compute node on the network, and stored in a plurality of distributed public ledgers; generate a future value estimate as a function of the received content and a Curry function accessible to the first compute node; provide at least one additional compute node on the network access to the future value estimate; apply the Curry function to the received content to generate value added content; and provide the value added content to at least one of: a compute node operating at a higher layer of the network for use as input to a second Curry function, or to a consumer compute node at a final layer of the network.

In Example 9, the subject matter of Example 8 optionally includes instructions to exchange resources recorded in a secure data store, wherein the exchange of resources depends on the future value estimate and a realized value of the value added content, and is enforced by the set of rules and criteria registered with the third node.

In Example 10, the subject matter of any one or more of Examples 8-9 optionally include wherein the content differs in type based on from which layer of the hierarchical network the content is received, and wherein the hierarchical network includes at least one of a sensor network, an information sensor network, a knowledge sensor network, or a wisdom sensor network to provide the content.

In Example 11, the subject matter of Example 10 optionally includes wherein the value added content differs in type based on the content type and the Curry function, and wherein the value added content comprises a type of either information, knowledge or wisdom, as derived from at least one content of a type data, information or knowledge, respectively, and wherein the Curry function corresponds to the content type.

Example 12 is a first node in a first layer of a hierarchical layered network, comprising: a processor coupled to memory, the memory storing instructions to configure the first node to negotiate with other nodes on the hierarchical layered network, wherein to negotiate includes instructions when executed by the processor to cause the first node to: form a smart contract with a second node for acquisition of content, generate a margin future with a margin function, the margin function including binding a Curry function to the content promised by the second node in the smart contract, register the margin future with a third node on the network, wherein responsive to the registering, the margin future is accessible by at least one resource providing node on the network, responsive to resource allocation corresponding to the margin future by the at least one resource providing node on the network, acquire the content electronically from the second node, apply the margin function to the acquired content to result in value added content to be traded electronically over the network, and provide the value added content to the network for payment by at least one consumer node.

In Example 13, the subject matter of Example 12 optionally includes an electronic wallet for electronic currency exchange coupled to the processor, the electronic wallet configured to send and receive electronic currency over the network, wherein responsive to the acquiring of the content, the electronic wallet is arranged to send payment to the second node via the network, the payment defined according to the smart contract, and wherein responsive to realization of the margin future that results from payments made by the at least one consumer node in purchase of the value added content, the electronic wallet is arranged to receive electronic currency according to conditions defined by the margin future regarding disbursement of electronic currency payments made for consumption of the value added content.

In Example 14, the subject matter of any one or more of Examples 12-13 optionally include wherein the content differs in type based on from which layer of the hierarchical layered network the content is acquired, and wherein the hierarchical network includes at least one of a sensor network, an information sensor network, a knowledge sensor network, or a wisdom sensor network.

In Example 15, the subject matter of any one or more of Examples 12-14 optionally include wherein the value added content differs in type based on the content type and the margin function, and wherein the value added content comprises a type of either information, knowledge or wisdom, as derived from at least one content of a type data, information or knowledge, respectively.

In Example 16, the subject matter of any one or more of Examples 12-15 optionally include wherein the Curry function is available from a third party, for a digital payment.

In Example 17, the subject matter of any one or more of Examples 12-16 optionally include wherein the electronic currency exchange is brokered through a market node on the network, the market node arranged to receive the payments made by information consumer nodes, disburse currency resulting from realization of the margin future to electronic wallets associated with one or more of the data first node, second node, third node, or resource providing mode, the disbursement calculated according to conditions associated with the registered margin future.

In Example 18, the subject matter of any one or more of Examples 12-17 optionally include wherein a transaction over the network is made via a central authority using an application program interface.

In Example 19, the subject matter of any one or more of Examples 12-18 optionally include wherein a transaction over the network is made using Blockchain technology and the transaction is published in a ledger accessible to nodes on the network.

In Example 20, the subject matter of Example 19 optionally includes wherein electronic currency promised by the data first node in the smart contract is committed via the Blockchain technology when the smart contract is electronically formed by the data first node and the second node.

In Example 21, the subject matter of any one or more of Examples 12-20 optionally include wherein calculation of the margin future uses seller attestation regarding validity or quality of the data to estimate a future value of information resulting in applying the margin function to the acquired data.

In Example 22, the subject matter of any one or more of Examples 12-21 optionally include wherein the smart contract is digitally signed by the second node and the data first node.

Example 23 is a layered hierarchical network of a plurality of e-markets, comprising: a first e-market configured to receive content from one of a sensor network or an intermediate e-market, the first e-market comprising a second node configured to provide the received content to a buyer node, the buyer node configured to transform the provided content to value added content using a margin future, the margin future generated with a margin function based on a Curry function, wherein the margin future is to be registered with an escrow agent node, and wherein an investor node is to invest in the margin future; the intermediate e-market configured to receive the value added content generated by one of the plurality of e-markets in the network, wherein the intermediate e-market is configured to generate an additional level of value added content to be provided to at least one additional e-market configured to add another additional level of value added content.

In Example 24, the subject matter of Example 23 optionally includes wherein, the first e-market is an information market configured to transform data into information, wherein the data is received from a sensor network, and further comprising additional intermediate e-markets comprising: a knowledge e-market configured to transform information into knowledge, wherein the information is received from an information sensor network provided by at least one information e-market; a wisdom e-market configured to transform knowledge into wisdom, wherein the knowledge is received from a knowledge sensor network provided by at least one knowledge e-market; and a consumer e-market configured to transform wisdom into marketable content, wherein the wisdom is received from a wisdom sensor network provided by at least one wisdom e-market, wherein transformation of content at delivery of value added content at each layer is to trigger payment in digital currency to at least one of the seller node, the buyer node, the escrow agent node, or the investor node, wherein distribution of payment is defined in the margin future registered with the escrow agent node.

In Example 25, the subject matter of any one or more of Examples 23-24 optionally include wherein transactions among the nodes in the network are recorded in a distributed public ledger according to Blockchain protocols.

In Example 26, the subject matter of any one or more of Examples 23-25 optionally include wherein the value added content differs in type based on the content type and the margin function, and wherein the value added content comprises a type of either information, knowledge or wisdom, as derived from at least one content of a type data, information or knowledge, respectively, and wherein the margin function corresponds to the content type.

In Example 27, the subject matter of any one or more of Examples 23-26 optionally include wherein a compute node on the network may effect transactions in an e-market in one or more layers of the hierarchical network and operate as any one or more of the buyer node, the seller node, the investor node, or the escrow agent node in the one or more e-markets.

Example 28 is a computer implemented method for an online hierarchical layered e-market exchange network, that includes a plurality of e-markets forming the hierarchical layered e-market, wherein each of the plurality of e-market is configured to add value to content received from one of a sensor network or another e-market and configured to provide value added content to one of an additional e-market or a consumer node, the computer implemented method comprising: negotiating by a Buyer node with a Seller node for a smart contract to acquire electronic content; digitally signing the smart contract; generating a Future by binding a Curry function to content expected to be received pursuant to the smart contract; registering the Future with an escrow agent node resulting in a registered Margin Future; negotiating with an Investor node for funding of the Margin Future; receiving the electronic content from the Seller, as defined in the smart contract; generating value added content derived from the received content by applying the Curry function to the received content; and providing the value added content to the online hierarchical layered e-market exchange network to one of the additional e-market or the consumer node, for payment, wherein payments made in the online data market exchange network are of digital currency to an electronic wallet associated with a node on the network.

In Example 29, the subject matter of Example 28 optionally includes wherein generating a Future by binding a Curry function to data expected to be received pursuant to the smart contract includes obtaining the Curry function from a third party, for a digital payment.

In Example 30, the subject matter of any one or more of Examples 28-29 optionally include using digital rights management protections to ensure that the digital information cannot be shared without payment.

In Example 31, the subject matter of any one or more of Examples 28-30 optionally include receiving an electronic payment into the electronic wallet, from a content market node, according to conditions of the registered Margin Future once the Future is realized due to exchanges for payment with at least one consumer node.

In Example 32, the subject matter of Example 31 optionally includes wherein responsive to a determination that the realized Future in an e-market layer did not meet expectations, apportioning partial payments to the Seller node, the Buyer node, the escrow agent node, and Investor node in the e-market layer, according to conditions recorded in the registered Margin Future.

In Example 33, the subject matter of any one or more of Examples 28-32 optionally include determining whether the Seller node attests validity or quality of the electronic data; and adjusting the Future based on assessed risk of the data based on attestation status.

In Example 34, the subject matter of any one or more of Examples 28-33 optionally include wherein the smart contract is a digital smart contract associated with a network implementing Blockchain technology, and wherein the smart contract is recorded in a public ledger in the Blockchain.

Example 35 is at least one computer readable storage medium in an online data market exchange network, the medium having instructions stored thereon, the instructions when executed by at least one processor cause a machine to perform the method of any of Examples 28-34.

Example 36 is a layered hierarchical network of a plurality of e-markets, comprising means to perform the method of any of Examples 28-34.

Example 37 is a system for an online hierarchical layered e-market exchange network, including a plurality of e-markets forming the hierarchical layered e-market, wherein each of the plurality e-market is configured to add value to content received from one of a sensor network or another e-market and provide value added content to one of an additional e-market or a consumer node, comprising: means for negotiating by a Buyer node with a Seller node for a smart contract to acquire electronic content; means for digitally signing the smart contract; means for generating a Future by binding a Curry function to content expected to be received pursuant to the smart contract; means for registering the Future with an escrow agent node resulting in a registered Margin Future; means for negotiating with an Investor node for funding of the Margin Future; means for receiving the electronic content from the Seller, as defined in the smart contract; means for generating value added content derived from the received content by applying the Curry function to the received content; and means for providing the value added content to the online hierarchical layered e-market exchange network to one of the additional e-market or the consumer node, for payment, wherein payments made in the online data market exchange network are of digital currency to an electronic wallet associated with a node on the network.

In Example 38, the subject matter of Example 37 optionally includes wherein means for generating a Future by binding a Curry function to data expected to be received pursuant to the smart contract includes obtaining the Curry function from a third party, for a digital payment.

In Example 39, the subject matter of any one or more of Examples 37-38 optionally include means for using digital rights management protections to ensure that the digital information cannot be shared without payment.

In Example 40, the subject matter of any one or more of Examples 37-39 optionally include means for receiving an electronic payment into the electronic wallet, from a content market compute node, according to conditions of the registered Margin Future once the Future is realized due to exchanges for payment with at least one consumer node.

In Example 41, the subject matter of Example 40 optionally includes wherein responsive to a determination that the realized Future in an e-market layer did not meet expectations, apportioning partial payments to the Seller node, the Buyer node, the escrow agent node, and Investor node in the e-market layer, according to conditions recorded in the registered Margin Future.

In Example 42, the subject matter of any one or more of Examples 37-41 optionally include means for determining whether the Seller node attests validity or quality of the electronic data; and means for adjusting the Future based on assessed risk of the data based on attestation status.

In Example 43, the subject matter of any one or more of Examples 37-42 optionally include wherein the smart contract is a digital smart contract associated with a network implementing Blockchain technology, and wherein the smart contract is recorded in a public ledger in the Blockchain.

Example 44 is a computer implemented method for an online hierarchical layered e-market exchange network, comprising: generating a set of rules and criteria associated with a transaction on the network, wherein the set of rules and criteria are registered on the network, and stored in a plurality of distributed public ledgers; receiving content, by a first compute node, in the transaction; generating a future value estimate as a function of the received content and a Curry function; providing at least one additional compute node on the network access to the future value estimate; applying the Curry function to the received content to generate value added content; and providing the value added content to at least one of a compute node operating at a higher layer of the network for use as input to a second Curry function, or to a consumer compute node at a final layer of the network.

In Example 45, the subject matter of Example 44 optionally includes exchanging resources recorded in a secure data store, wherein exchanging resources depends on the future value estimate and a realized value of the value added content; and enforcing the set of rules and criteria registered on the network for the transaction during exchanging the resources.

In Example 46, the subject matter of any one or more of Examples 44-45 optionally include wherein the content differs in type based on from which layer of the hierarchical network the content is received, and wherein the hierarchical network includes at least one of a sensor network, an information sensor network, a knowledge sensor network, or a wisdom sensor network to provide the content, and wherein the value added content differs in type based on the content type and the Curry function, and wherein the value added content comprises a type of either information, knowledge or wisdom, as derived from at least one content of a type data, information or knowledge, respectively, and wherein the Curry function corresponds to the content type.

Example 47 is a system configured to perform operations of any one or more of Examples 1-46.

Example 48 is a method for performing operations of any one or more of Examples 1-46.

Example 49 is at least one machine readable storage medium including instructions that, when executed by a machine cause the machine to perform the operations of any one or more of Examples 1-46.

Example 50 is a system comprising means for performing the operations of any one or more of Examples 1-46.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter may be practiced with various computer system configurations, including multiprocessor or multiple-core processor systems, minicomputers, mainframe computers, as well as pervasive or miniature computers or processors that may be embedded into virtually any device. Embodiments of the disclosed subject matter may also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus for providing value added content in a hierarchical layered network, comprising:
    a first node having a processor communicatively coupled to a storage device including instructions that when executed by the processor, cause the processor to:
        receive content from a second node in a transaction via the network, wherein the first node and second node are to generate a set of rules and criteria associated with the transaction, and wherein the set of rules and criteria are registered with a third node on the network, and stored in a plurality of distributed public ledgers;
        generate a future value estimate as a function of the received content and a curry function accessible to the first node;
        provide access to the future value estimate to at least one additional node on the network;
        apply the curry function to the received content to generate value added content, wherein the value added content is an item of electronic data that modifies the received content based on the set of rules and criteria associated with the transaction;
        provide the value added content to at least one of a node operating at a higher layer of the network for use as input to a second curry function, or to a consumer node at a final layer of the network;
        record the value added content in a secure data store; and
        grant access to the value added content recorded in the secure data store in response to satisfying the set of rules and criteria registered with the third node.

2. The apparatus as recited in claim 1, further comprising an electronic wallet coupled to the secure data store to effect an exchange of a payment for the value added content, wherein the electronic wallet is configured to send and receive digital currency over the network, wherein responsive to the receiving of the value added content in the secure data store, the electronic wallet is arranged to send a payment resource to the second node via the network, the payment resource defined according to the set of rules and criteria associated with the transaction, and wherein, responsive to a disbursement of a payment for a consumption of the value added content, the electronic wallet is arranged to receive the payment for the consumption of the value added content.

3. The apparatus as recited in claim 1, wherein the content differs in type based on from which layer of the hierarchical network the content is received, and wherein the hierarchical network includes at least one of a sensor network, or an information sensor network, wherein the value added content differs in type based on the content type and the curry function used to add value to the content, and wherein the value added content comprises a type of information, as derived from at least one content of a type of data or information.

4. The apparatus as recited in claim 1, wherein the curry function is available from a third party, for a digital payment.

5. The apparatus as recited in claim 1, wherein a digital currency exchange is brokered through a market compute node on the network, the market compute node arranged to receive the value added content exchanged in the network, disburse payment for the value added content to an electronic wallet associated with one or more of the compute nodes involved in the transaction of adding value to the content, the disbursement calculated according to conditions associated with the set of rules and criteria and the future value estimate.

6. The apparatus as recited in claim 1, wherein a transaction over the network is made using Blockchain technology and the transaction is published in a ledger accessible to nodes on the network.

7. The apparatus as recited in claim 1, wherein a compute node on the network may participate in transactions in more than one layer in the hierarchical layered network.

8. At least one non-transitory computer readable storage medium having instructions stored thereon, the instructions when executed on a first compute node in a hierarchical layered network, cause the first compute node to:
  receive content from a second compute node in a transaction via the network, wherein the first compute node and second compute node generate a set of rules and criteria associated with the transaction, and wherein the set of rules and criteria are registered with a third compute node on the network, and stored in a plurality of distributed public ledgers;
  generate a future value estimate as a function of the received content and a curry function accessible to the first compute node;
  provide access to the future value estimate to at least one additional compute node on the network;
  apply the curry function to the received content to generate value added content, wherein the added value content is an item of electronic data that modifies the received content based on the set of rules and criteria associated with the transaction; and
  provide the value added content to at least one of a compute node operating at a higher layer of the network for use as input to a second curry function, or to a consumer compute node at a final layer of the network.

9. The storage medium as recited in claim 8, further comprising instructions to:
  record the value added content in a secure data store; and
  grant access to the value added content recorded in the secure data store in response to satisfying the set of rules and criteria registered with the third compute node.

10. The storage medium as recited in claim 8, wherein content differs in type based on from which layer of the hierarchical network the content is received, and wherein the hierarchical network includes at least one of a sensor network or an information sensor network to provide the content.

11. The storage medium as recited in claim 10, wherein the value added content differs in type based on the content type and the curry function, and wherein the value added content comprises a type of information as derived from at least one content of a type of data or information and wherein the curry function corresponds to the content type.

12. A first node in a first layer of a hierarchical layered network, comprising:
  a processor coupled to memory, the memory storing instructions to configure the first node to negotiate with other nodes on the hierarchical layered network, wherein to negotiate includes instructions when executed by the processor to cause the first node to:
    form a smart contract with a second node in a transaction via the network for acquisition of content received from the second node,
    generate a margin future with a margin function, the margin function including binding a curry function to the content promised by the second node in the smart contract,
    register the margin future with a third node on the network, wherein responsive to the registering, the margin future is accessible by at least one resource providing node on the network,
    responsive to resource allocation corresponding to the margin future by the at least one resource providing node on the network, acquire the content electronically from the second node,
    apply the margin function to the acquired content to result in value added content to be traded electronically over the network, wherein the value added content is an item of electronic data that modifies the received content based on a set of rules and criteria associated with the transaction, and
    grant access to the value added content to the network in response to satisfying the set of rules and criteria associated with the transaction.

13. The first node as recited in claim 12, further comprising:
  an electronic wallet for electronic currency exchange coupled to the processor, the electronic wallet configured to send and receive electronic currency over the network, wherein responsive to the acquiring of the content, the electronic wallet is arranged to send payment to the second node via the network, the payment defined according to the smart contract, and wherein responsive to realization of the margin future that results from payments made by at least one consumer node in purchase of the value added content, the electronic wallet is arranged to receive electronic currency according to conditions defined by the margin future regarding disbursement of electronic currency payments made for consumption of the value added content.

14. The first node as recited in claim 12, wherein the content differs in type based on from which layer of the hierarchical layered network the content is acquired, and wherein the hierarchical network includes at least one of a sensor network or an information sensor network.

15. The first node as recited in claim 12, wherein the value added content differs in type based on the content type and the margin function, and wherein the value added content comprises a type of information as derived from at least one content of a type of data or information.

16. The first node as recited in claim 12, wherein the curry function is available from a third party, for a digital payment.

17. The first node as recited in claim 13, wherein the electronic currency exchange is brokered through a market node on the network, the market node arranged to receive the payments made by information consumer nodes, disburse currency resulting from realization of the margin future to electronic wallets associated with one or more of: the first node, the second node, the third node, or the resource providing node, the disbursement calculated according to conditions associated with the registered margin future.

18. The first node as recited in claim 12, wherein a transaction over the network is made via a central authority using an application program interface.

19. The first node as recited in claim 12, wherein a transaction over the network is made using Blockchain technology and the transaction is published in a ledger accessible to nodes on the network.

20. The first node as recited in claim 19, wherein electronic currency promised by the data first node in the smart contract is committed via the Blockchain technology when the smart contract is electronically formed by the data first node and the second node.

21. The first node as recited in claim 12, wherein calculation of the margin future uses seller attestation regarding validity or quality of the data to estimate a future value of information resulting in applying the margin function to the acquired data.

22. The first node as recited in claim 12, wherein the smart contract is digitally signed by the second node and the data first node.

23. A computer implemented method for an online hierarchical layered e-market exchange network, comprising:
   generating a set of rules and criteria associated with a transaction on the network, wherein the set of rules and criteria are registered on the network, and stored in a plurality of distributed public ledgers;
   receiving content, by a first compute node, in the transaction;
   generating a future value estimate as a function of the received content and a curry function;
   providing access to the future value estimate to at least one additional compute node on the network;
   applying the curry function to the received content to generate value added content wherein the value added content is an item of electronic data; and
   providing the value added content to at least one of a compute node operating at a higher layer of the network for use as input to a second curry function, or to a consumer compute node at a final layer of the network.

24. The method as recited in claim 23, further comprising:
   recording the value added content in a secure data store;
   granting access to the value added content recorded in the secure data store; and
   enforcing the set of rules and criteria registered on the network for the transaction during granting of access to the value added content.

25. The method as recited in claim 23, wherein the content differs in type based on from which layer of the hierarchical network the content is received, and wherein the hierarchical network includes at least one of a sensor network or an information sensor network, to provide the content, and
   wherein the value added content differs in type based on the content type and the curry function, and wherein the value added content comprises a type of information as derived from at least one content of a type of data or information, and wherein the curry function corresponds to the content type.

* * * * *

UNITED STATES PATENT AND TRADEMARK OFFICE
CERTIFICATE OF CORRECTION

PATENT NO. : 11,100,483 B2  
APPLICATION NO. : 15/858097  
DATED : August 24, 2021  
INVENTOR(S) : Smith et al.

Page 1 of 1

It is certified that error appears in the above-identified patent and that said Letters Patent is hereby corrected as shown below:

On the Title Page

Item (72), in "Inventors", in Column 1, Line 4, delete "Action," and insert --Acton,-- therefor Signed and Sealed this
Sixteenth Day of November, 2021

Drew Hirshfeld
*Performing the Functions and Duties of the
Under Secretary of Commerce for Intellectual Property and
Director of the United States Patent and Trademark Office*